United States Patent
Rubin et al.

(10) Patent No.: US 9,418,465 B2
(45) Date of Patent: Aug. 16, 2016

(54) MULTIPOINT OFFSET SAMPLING DEFORMATION TECHNIQUES

(71) Applicant: DreamWorks Animation LLC, Glendale, CA (US)

(72) Inventors: Mark R. Rubin, Los Angeles, CA (US); Robert Lloyd Helms, San Francisco, CA (US); Arthur D. Gregory, Los Angeles, CA (US); Peter Dean Farson, Glendale, CA (US); Matthew Christopher Gong, Pasadena, CA (US); Michael Scott Hutchinson, San Mateo, CA (US)

(73) Assignee: DreamWorks Animation LLC, Glendale, CA (US)

( * ) Notice: Subject to any disclaimer, the term of this patent is extended or adjusted under 35 U.S.C. 154(b) by 0 days.

(21) Appl. No.: 14/145,548

(22) Filed: Dec. 31, 2013

(65) Prior Publication Data
US 2015/0187113 A1 Jul. 2, 2015

(51) Int. Cl.
*G06T 15/00* (2011.01)
*G06T 13/40* (2011.01)

(52) U.S. Cl.
CPC .................................... *G06T 13/40* (2013.01)

(58) Field of Classification Search
CPC ........................................................ G06T 13/40
USPC .................... 345/418, 419, 473, 474, 475
See application file for complete search history.

(56) References Cited

U.S. PATENT DOCUMENTS

| | | | |
|---|---|---|---|
| 4,441,201 A | 4/1984 | Henderson et al. | |
| 6,037,949 A | 3/2000 | DeRose et al. | |
| 6,400,368 B1 | 6/2002 | Laperriére | |
| 6,992,665 B2* | 1/2006 | Toyama et al. | 345/419 |
| 7,307,633 B2* | 12/2007 | Anderson et al. | 345/473 |
| 7,333,111 B2* | 2/2008 | Ng-Thow-Hing et al. | 345/473 |
| 7,515,155 B2* | 4/2009 | Anderson et al. | 345/473 |
| 7,859,538 B2 | 12/2010 | Isner et al. | |
| 8,237,775 B2* | 8/2012 | Givon | 348/42 |
| 8,358,310 B2* | 1/2013 | Miller et al. | 345/473 |
| 8,531,464 B1 | 9/2013 | Cohen | |

(Continued)

FOREIGN PATENT DOCUMENTS

WO 2004/104936 A1 12/2004

OTHER PUBLICATIONS

Extended European Search Report received for European Patent Application No. 12187147.9 mailed on Sep. 25, 2013, 8 pages.

(Continued)

*Primary Examiner* — Phu K Nguyen
(74) *Attorney, Agent, or Firm* — Morrison & Foerster LLP

(57) ABSTRACT

Systems and methods for performing MOS skin deformations are provided. In one example process, the in vector of a MOS transform may be manually configured by a user. In another example process, a slide/bulge operation may be configured to depend on two or more MOS transforms. Each of the MOS transforms may be assigned a weight that represents the transform's contribution to the overall slide/bulge. In yet another example process, a bulge operation for a MOS vertex may be performed in a direction orthogonal to the attached MOS curve regardless of the direction of the attachment vector. In yet another example process, a ghost transform may be inserted into a MOS closed curve and used to calculate skin deformations associated with first transform of the MOS closed curve.

34 Claims, 19 Drawing Sheets

(56) References Cited

U.S. PATENT DOCUMENTS

| | | | |
|---|---|---|---|
| 2005/0062737 | A1 | 3/2005 | Wang et al. |
| 2006/0284099 | A1 | 12/2006 | Ruehrnschopf |
| 2007/0268293 | A1 | 11/2007 | Miller et al. |
| 2009/0179899 | A1 | 7/2009 | Gregory et al. |
| 2010/0134490 | A1 | 6/2010 | Corazza et al. |

OTHER PUBLICATIONS

Final Office Action received for U.S. Appl. No. 13/269,477, mailed on Mar. 21, 2014, 23 pages.
Non Final Office Action received for U.S. Appl. No. 13/269,477, mailed on May 7, 2015, 23 pages.
Office Action received for Chinese Patent Application No. 201210369654.2, mailed on Aug. 18, 2015, 17 pages. (9 pages of English Translation and 8 pages official copy).
Catmull et al., "Recursively Generated B-Spline Surfaces on Arbitrary Topological Meshes", Computer-Aided Design, vol. 10, No. 6, Nov. 1978, pp. 350-355.
Foley et al., "Computer Graphics: Principles and Practice", Second Edition in C, Jul. 1997, 14 pages.
Park et al., "Capturing and Animating Skin Deformation in Human Motion", Siggraph, vol. 25, No. 3, 2006, 9 pages.
Rhee et al., "Real-Time Weighted Pose-Space Deformation on the GPU", Eurographics, vol. 25, No. 3, 2006, 10 pages.
Wilhelms, Jane, "Modeling Animals with Bones, Muscles, and Skin", USCS-CRL-95-01, Jan. 24, 1994, pp. 1-20.
"Weight Paint", Blender Wiki Pdf Manual, Weight Paint, 2010, , 10 pages.
Non-Final Office Action received for U.S. Appl. No. 13/269,477, mailed on May 20, 2013, 15 pages.
Partial European Search Report received for European Patent Application No. 14200508.1, mailed on Jan. 5, 2016, 6 pages.
Kuderle, Terence B., "Muscle-Based Facial Animation", University of Applied Science Wedel, Feb. 24, 2005, 158 pages.
Office Action received for Chinese Patent Application No. 201210369654.2, mailed on Jan. 29, 2016, 9 pages (5 pages of English Translation and 4 pages of Official Copy).
Extended European Search Report (includes Supplementary European Search Report and Search Opinion) received for European Patent Application No. 14200508.1, mailed on Apr. 22, 2016, 9 pages.

* cited by examiner

Image
100

Character 701

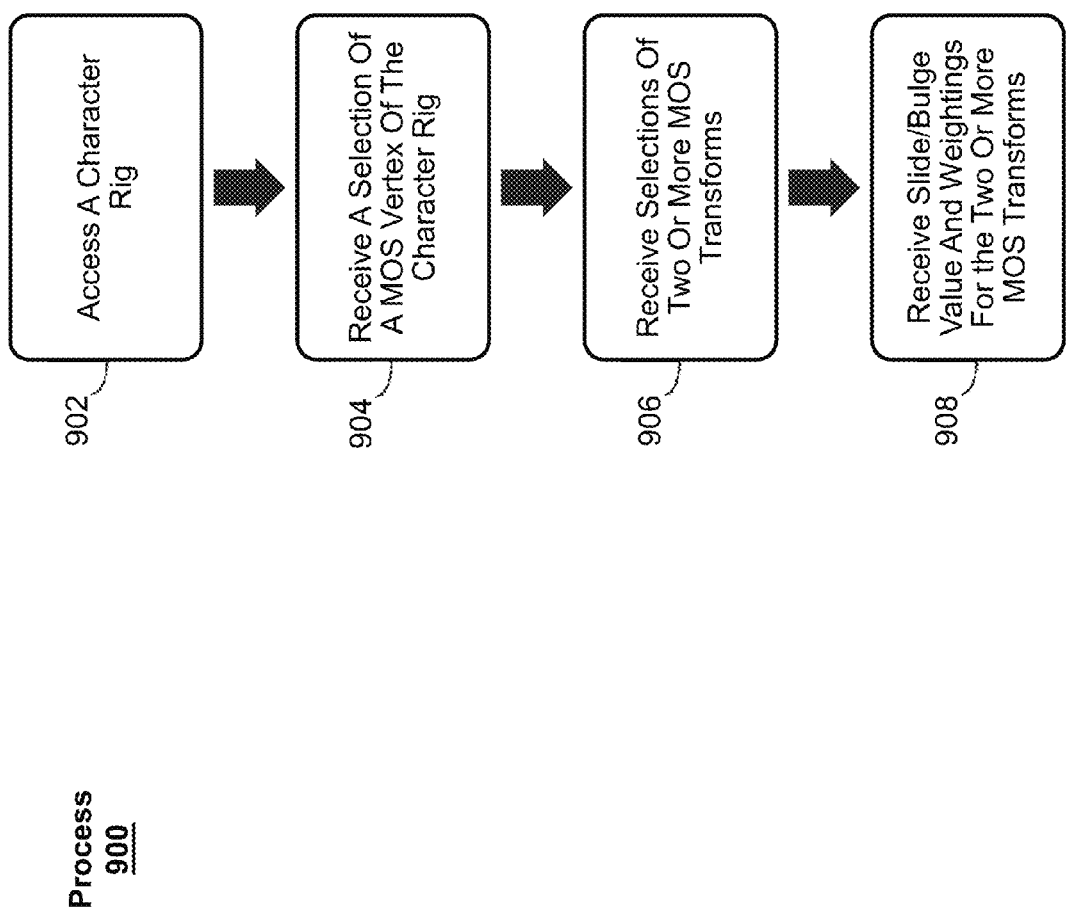

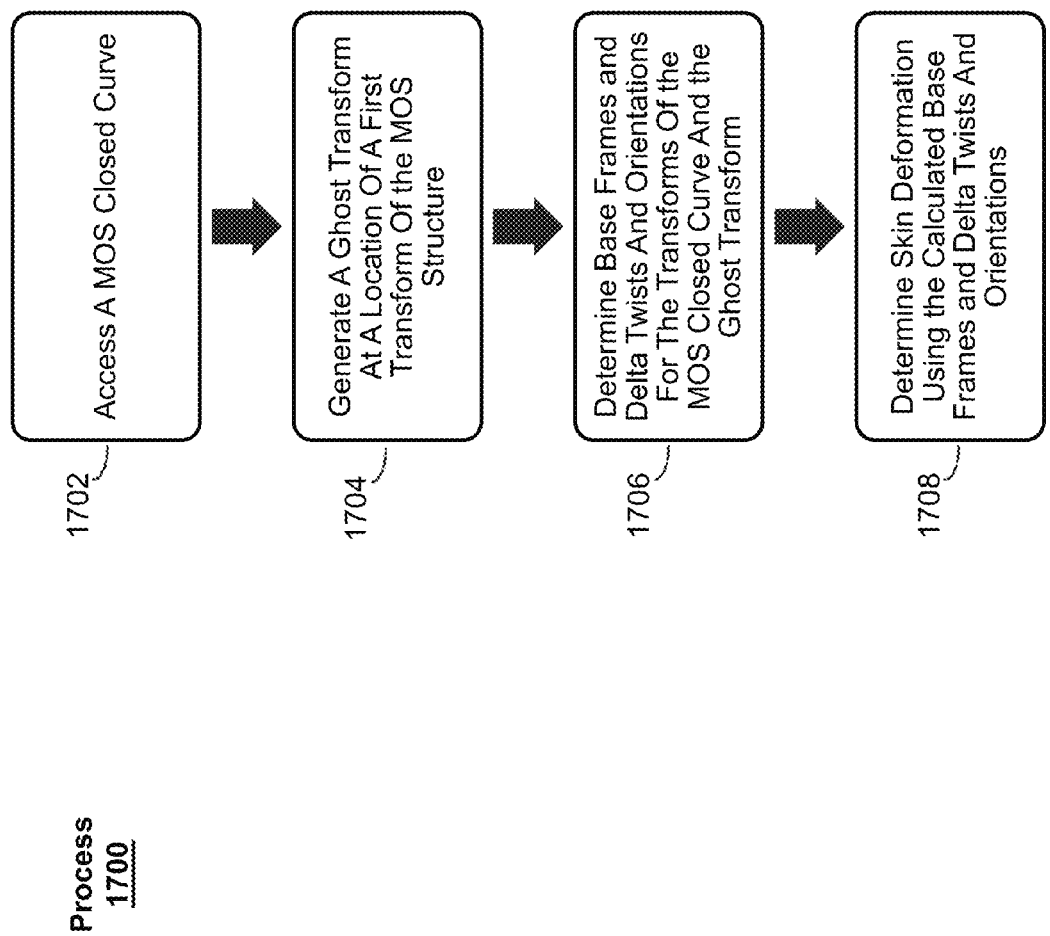

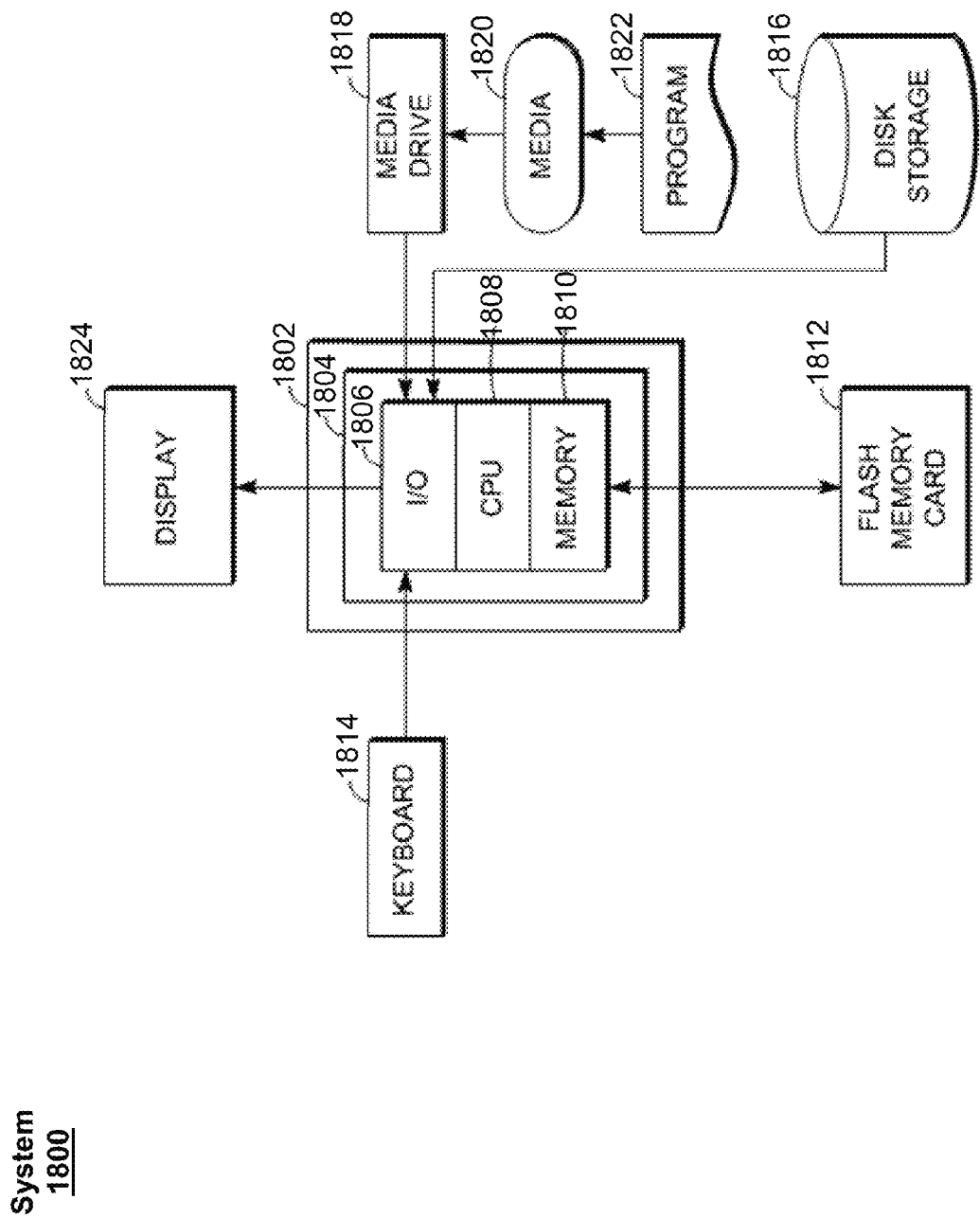

MULTIPOINT OFFSET SAMPLING DEFORMATION TECHNIQUES

BACKGROUND

1. Field

This application relates generally to computer graphics and, more specifically, to the deformation of skin on a computer-generated character in computer animation.

2. Related Art

In the field of computer animation, a computer-generated character is typically modeled using a character rig having a skeleton structure covered with a skin layer that moves, or deforms, in response to movements of the skeleton structure. Animators may then animate the character by manipulating the positions of the bones and joints of the character's rig. Animating characters in this way can be more computationally efficient than the use of, for example, multiple individual drawings to produce an animation.

Since the skin layer of a computer-generated character is outwardly visible to viewers of the computer animation, efficient deformation techniques that produce convincing skin deformations are desirable. For example, if an animator chooses to bend the elbow of a computer-generated character, it would be desirable to deform the skin layer with a life like bulge at the biceps with minimal input from the animator and with minimal use of computing resources.

One deformation system that may be used to simulate skin deformations is the multipoint offset sampling (MOS) deformation system. In this system, the skin deformation of a character may be computed using hierarchically structured data types. In particular, the skeletal structure of a character may be represented by MOS transforms (e.g., representing joints of a character's body) connected together by implicit vectors (e.g., bones of the character's body). The MOS transforms may be associated with and control MOS vertices such that the positions of the MOS vertices are defined by the positions and orientations of the MOS transforms. The MOS vertices may in turn define the shapes and positions of MOS curves that are connected to skin vertices located on, adjacent to, or otherwise associated with the surface of a character's skin. The positions of the skin vertices relative to their connected MOS curves may depend on the orientations of associated MOS transforms.

The process that moves skin vertices relative to their associated MOS curves may be referred to as a "skin deformation." Example skin deformation operations include bulge, slide, and twist operations. A character rigger may apply varying levels of these skin deformation operations to select skin vertices of a character rig to produce desired skin deformations when the positions of the MOS transforms are manipulated.

While conventional MOS deformation systems can be used to produce realistic animations, these systems typically include rigid assumptions that limit the rigger's ability to efficiently and intuitively model the appearance of a character's skin.

SUMMARY

Processes for configuring and performing a skin deformation for a computer-animated character are described. One example process may include accessing, by one or more processors, a character rig representing the animated character and comprising a plurality of multipoint offset sampling (MOS) transforms and a plurality of MOS vertices; receiving, by the one or more processors, a selection of a MOS transform of the plurality of MOS transforms, wherein a bulge skin deformation of at least one MOS vertex of the plurality of MOS vertices is controlled by the selected MOS transform; and receiving, by the one or more processors, an orientation of a reference vector assigned to the selected MOS transform, wherein a bulge direction of the bulge skin deformation of the at least one MOS vertex depends on the orientation of the reference vector.

In one example, the process may further include calculating, by the one or more processors, the bulge skin deformation of the at least one MOS vertex using the orientation of the reference vector. The at least one MOS vertex may include an in bulge value, an out bulge value, and a side bulge value, wherein calculating the bulge skin deformation of the at least one MOS vertex includes calculating a bulge amount and the bulge direction based on the in bulge value, the out bulge value, the side bulge value, and the orientation of the reference vector.

In another example, the orientation of the reference vector may include a set of three-dimensional coordinates that are referenced with respect to an orientation of the selected MOS transform.

In another example, the character rig may further include: a first twist axis between the selected MOS transform and a first adjacent MOS transform; and a second twist axis between the selected MOS transform and a second adjacent MOS transform, wherein the reference vector is non-overlapping with a bisection of the first twist axis and the second twist axis.

Another example process for calculating a skin deformation for a computer-animated character may include accessing, by one or more processors, a character rig representing the animated character and comprising a plurality of multipoint offset sampling (MOS) transforms and a plurality of MOS vertices; receiving, by the one or more processors, a selection of a MOS vertex of the plurality of MOS vertices; receiving, by the one or more processors, a selection of two or more MOS transforms of the plurality of MOS transforms; receiving, by the one or more processors, a value for a skin deformation to be applied to the selected MOS vertex, wherein the skin deformation is controlled by the selected two or more MOS transforms; receiving, by the one or more processors, a weight value for each of the two or more MOS transforms, wherein the weight values represent relative amounts that each of the two or more MOS transforms contribute to the skin deformation; and calculating, by the one or more processors, the skin deformation for the selected MOS vertex based on the value for the skin deformation and the weight values for the two or more MOS transforms.

In one example, the skin deformation may include a bulge operation or a slide operation. In another example, calculating the skin deformation for the selected MOS vertex based on the value for the skin deformation and the weight values for the two or more MOS transforms may include: determining, by the one or more processors, a skin deformation contribution for each of the two or more MOS transforms by multiplying the value for the skin deformation by each of the weight values; and calculating a sum of the determined skin deformation contributions.

Another example process for calculating a skin deformation for a computer-animated character may include accessing, by one or more processors, a character rig representing the animated character and comprising a plurality of multipoint offset sampling (MOS) transforms and a plurality of MOS vertices; determining, by the one or more processors, a bulge amount of a bulge skin deformation for a MOS vertex of the plurality of MOS vertices, wherein the bulge skin deformation for the MOS vertex is controlled by a MOS transform of the plurality of MOS transforms, and wherein the bulge amount represents a distance between the MOS vertex and a twist axis between the MOS transform and an adjacent MOS transform of the plurality of MOS transforms; determining, by the one or more processors, a vector that is orthogonal to the twist axis, wherein the vector passes through the MOS vertex and the twist axis; and determining, by the one or more processors, a position of the MOS vertex based on the determined bulge amount and the determined vector.

In one example, determining the bulge amount for the MOS vertex may include determining an orientation of the MOS transform, wherein the bulge amount depends on the determined orientation of the MOS transform.

In another example, the MOS vertex is associated with the twist axis by an attachment vector that is not orthogonal to the curve.

In another example, the determined position of the MOS vertex is a position along the vector that is a distance equal to the bulge amount away from the twist axis.

Another example process for calculating a skin deformation for a multipoint offset sampling (MOS) closed curve of a computer-animated character may include accessing, by one or more processors, the MOS closed curve, wherein the MOS closed curve comprises a plurality of MOS transforms sequentially coupled together to form a loop; generating, by the one or more processors, a duplicate MOS transform of a first MOS transform of the plurality of MOS transforms, wherein the duplicate MOS transform comprises a location corresponding to a location of the first MOS transform and an orientation corresponding to an orientation of the first MOS transform; calculating, by the one or more processors, base frames and delta twists and orientations for each of the plurality of MOS transforms and the duplicate MOS transform; and calculating, by the one or more processors, the skin deformation using the calculated base frames and delta twists and orientations, wherein the skin deformation for skin vertices coupled to the MOS closed curve between the first MOS transform and an adjacent second MOS transform are calculated using the calculated base frames and delta twists and orientations for the duplicate MOS transform and the second MOS transform.

Systems and computer-readable storage media for configuring and performing MOS skin deformations are also described.

BRIEF DESCRIPTION OF THE FIGURES

The present application can be best understood by reference to the following description taken in conjunction with the accompanying figures, in which like parts may be referred to by like numerals.

FIG. 9 illustrates an exemplary process for configuring a skin deformation that depends on multiple MOS transforms according to various examples.

FIG. 17 illustrates an exemplary process for computing a skin deformation for a closed MOS curve according to various examples.

FIG. 18 illustrates an exemplary computing system.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Various embodiments are described below relating to MOS deformation techniques. In one example process, the in vector of one or more MOS transforms of a character rig may be manually configured by a user. This in vector may then be used in MOS deformation computations to determine the application and direction of bulge operations. In another example process, a slide or bulge operation may be configured to depend on two or more MOS transforms. Each of the two or more transforms may be assigned a weight value that represents the transform's contribution to the overall slide or bulge. The total slide or bulge for a skin vertex may be determined by calculating the sum of the individual slide or bulge contributions from each of the MOS transforms. In yet another example process, a bulge operation for a skin vertex may be performed in a direction orthogonal to the vector connecting associated MOS transforms regardless of the direction of the attachment vector connecting the skin vertex to the MOS curve. In yet another example process, a ghost transform may be inserted into a closed MOS curve and used to calculate skin deformations associated with the first transform of the closed MOS curve.

1. Overview

Figure 1:
FIG. 1 illustrates an exemplary rendered image that may be generated using a MOS deformation technique according to various examples.

FIG. 1 depicts an exemplary computer-generated image 100 that may be rendered using MOS deformation techniques according to various examples. Notably, FIG. 1 depicts skin deformations generated based on the position of the character's MOS curves and transforms. For the sake of clarity and convenience, example MOS deformation techniques may be described herein with reference to animating a computer-generated character similar to that shown in image 100. However, it should be recognized that the MOS deformation techniques may be similarly applied to other computer-generated characters or objects. Additionally, as used herein, "skin" may refer to a number of coverings used with a computer-generated character. For example, a "skin" may refer to the furry skin of an animal and/or the clothing worn by the animal. The examples described herein are not intended to limit the applications of the MOS deformation techniques.

2. MOS Deformation System

As mentioned above, in MOS deformation systems, the skeletal structure of a character may be represented by MOS transforms (e.g., representing joints of a character's body) connected together by implicit vectors (e.g., bones of the character's body). The MOS transforms may be associated with and control MOS vertices such that the positions of the MOS vertices are defined by the positions and orientations of the MOS transforms. The MOS vertices may in turn define the shapes and positions of MOS curves that are connected to skin vertices located on, adjacent to, or otherwise associated with the surface of a character's skin. The positions of the skin vertices relative to their connected MOS curves may depend on the orientations of associated MOS transforms.

Figure 2:
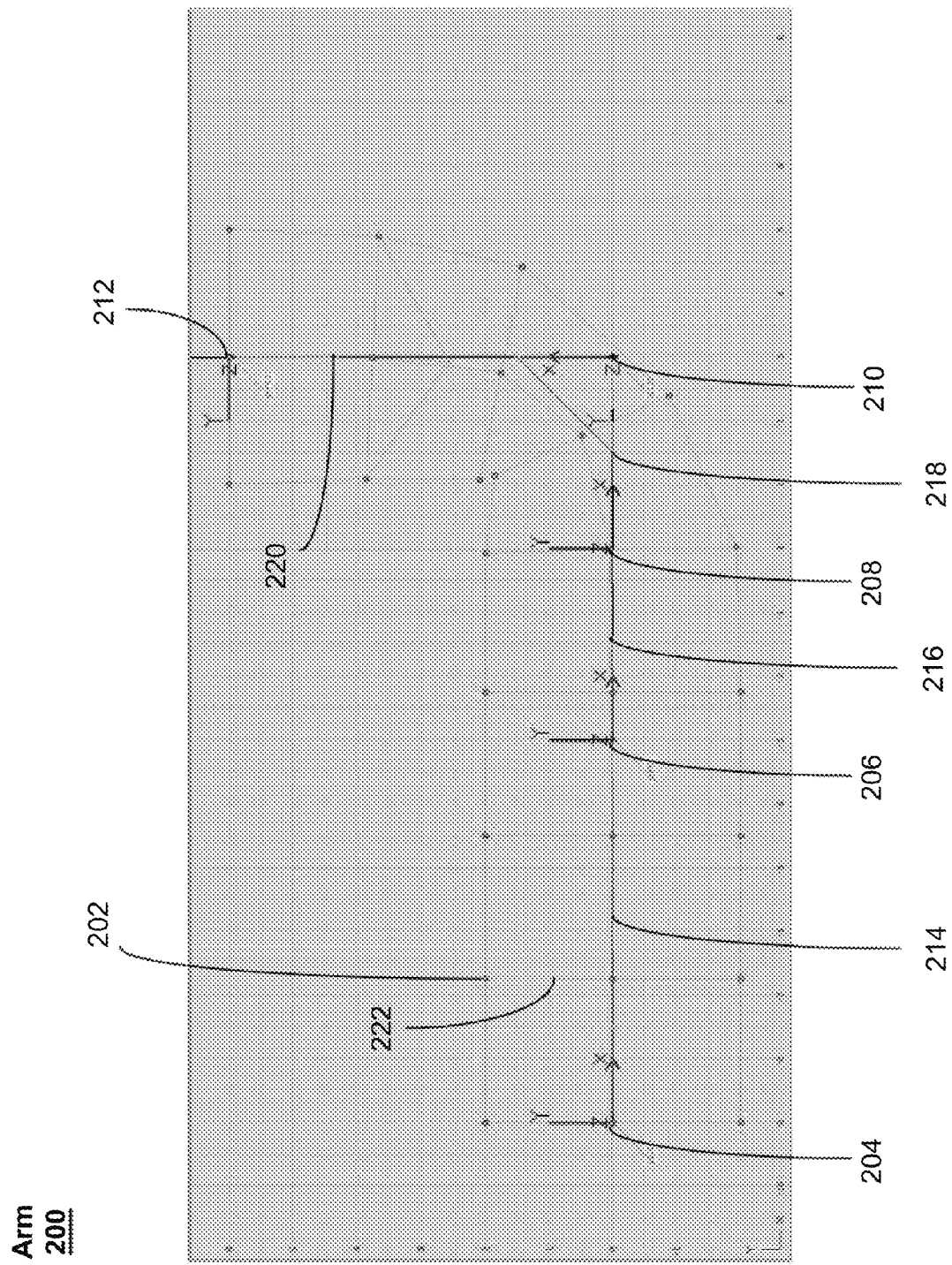
FIG. 2 illustrates skin vertices, MOS curves, and MOS transforms according to various examples.

To illustrate, FIG. 2 shows arm 200 having skin vertices (represented by dots); MOS transforms 204, 206, 208, 210, and 212; and MOS curves 214, 216, 218, and 220. The MOS transforms 204, 206, 208, 210, and 212 are connected together by implicit vectors (not shown) that, in this example, overlap with the MOS curves 214, 216, 218, and 220. As shown, the skin vertices are each connected to a MOS curve by an attachment vector represented by the lines connecting the vertices to the MOS curves (e.g., vertex 202 is connected to MOS curve 214 by attachment vector 222). The MOS vertices (not shown) may be controlled by the MOS transforms and may drive the position and shape of the MOS curves. The resulting skin surface may be generated based on the positions of the skin vertices.

Specifically, in some examples, the movement of a character's joint may result in a change in position and orientation of a MOS transform. The new position and orientation of the MOS transform may then be used to calculate the spatial positions of associated MOS vertices. Additionally, the positions and orientations of the MOS transform and the MOS transform's reference position (e.g., representing a starting or rest position), along with their associated twist axes, may be used to calculate various frames (e.g., 3-dimensional orientations). Next, for each skin vertex, the vertex's binding position along its associated MOS curve and the offset vector may be retrieved. The position of binding along the MOS curve may be used to determine which MOS vertices affect the skin vertex and to determine a blending coefficient for each MOS vertex. The blending coefficients may then be applied to the MOS vertex's twist and scale settings to determine a per-skin-vertex twist and scale. Next, for each MOS vertex, a final frame may be computed based on the skin vertex's blended twist and scale and the associated MOS transform's various frames. The skin vertex's binding offset vector may be transformed by the final frame and added to the MOS vertex's spatial position. Referring back to the each skin vertex, the skin vertex's per-MOS-vertex positions may be multiplied by the blending coefficients and added together to generate the final deformed skin position.

While the vectors connecting the MOS transforms overlap the MOS curves in FIG. 2, it should be appreciated that in other examples, the connecting vectors and MOS curves may not be aligned. Additionally, while MOS curves 214, 216, 218, and 220 are identified as being separate curves, they may instead be treated as a single curve. Moreover, it should be appreciated that a character rig may include multiple MOS curves.

3. MOS Operations

Using a model similar to that shown in FIG. 2, a rigger may modify the way in which the skin of the arm changes in response to movement of the MOS transforms (joints in the arm) by adjusting the amount and application of MOS operations, such as bulge, slide, and twist operations, to skin vertices of the character rig via the MOS vertices. These MOS operations may be applied to individual MOS vertices and may be associated with a MOS operation transform such that the skin deformation depends on the orientation of the associated MOS operation transform. The MOS operation transform may or may not be the same transform that is parented to the MOS vertices and that controls the positions of the MOS vertices. For example, a MOS vertex may be associated with a first MOS transform that controls the position of the MOS vertex based on the position and orientation of the first MOS transform. The MOS vertex may further be associated with a slide/bulge MOS transform that controls the amount and direction of the slide or bulge. In other examples, a single MOS transform may control both the position of the MOX vertex and the amount and direction of the slide or bulge operation.

Figure 3:
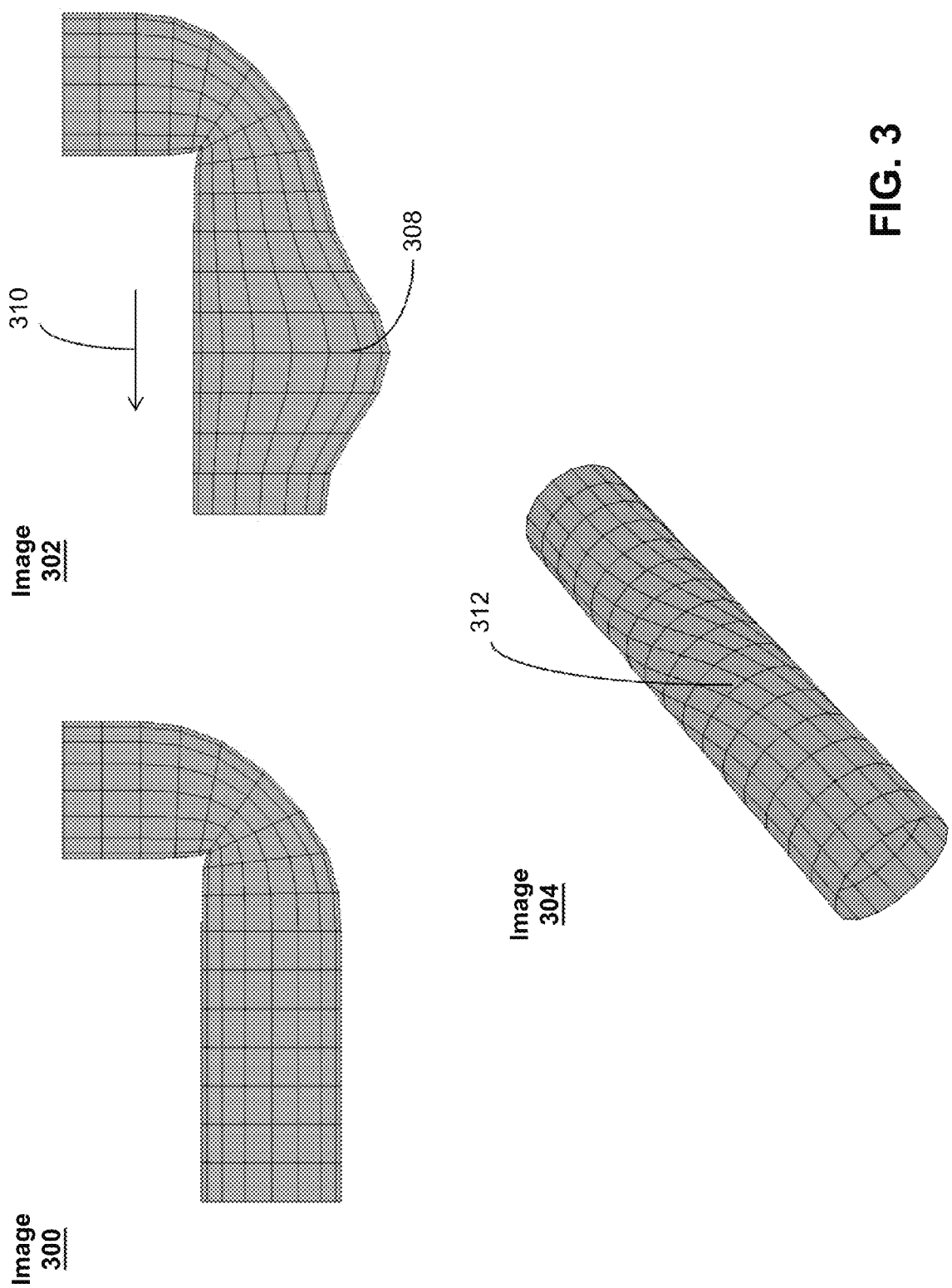
FIG. 3 illustrates various skin deformations that may be produced using a MOS deformation technique according to various examples.

To illustrate these operations, FIG. 3 shows an image 300 of a mesh surface representation of an arm that was originally straight, but is shown in a flexed position as controlled by a MOS deformation without any per-MOS-vertex operations, such as slide and bulge. As shown, the skin around the forearm and the skin around the upper arm have substantially cylindrical shapes. However, as shown in image 302, a bulge operation may be performed on portion 308, causing the skin to increase in volume and extend vertically away from the arm. Additionally, a slide operation may be performed that causes the skin to shift in direction 310 away from the bent MOS transform. If a MOS transform of the arm shown in image 300 is instead twisted around a twist axis, an arm similar to that shown in image 304 may be generated using a twist operation. As a result of the twist operation, a twisting of the skin around section 312 may be generated, with the amount of twist being dependent on the amount of rotation at the relevant MOS transform.

4. MOS Deformation Computations—Manual in Vector

In MOS deformation computations, the bulge operation for a skin vertex may be dependent on the orientation of its associated MOS transform. For example, it may be desirable to cause a bulge operation applied to a skin vertex (via one or more MOS vertices) of a character's biceps to depend on the orientation of the MOS transform representing the elbow joint. To configure this operation, a rigger may assign a numerical value representing a desired amount of bulge and an identification of the MOS transform (e.g., the elbow joint) that controls the bulge. The bulge amount may represent a scaling factor to be applied to the distance between the skin vertex and its associated MOS curve in response to changes in the orientation of the relevant MOS transform. For example, the rigger may specify that a skin vertex (via one or more MOS vertices) on the character's biceps should have a maximum bulge amount of X and that the bulge should be controlled by the MOS transform representing the character's elbow. For example, the amount of bulge may be controlled by the angle between the two twist axes entering and exiting the MOS transform. As a result, the skin vertex may experience no bulge when the elbow is at rest (e.g., when the arm is fully extended), may experience the full X bulge amount when the elbow is completely bent (e.g., a 180-degree bend), and may experience a linear scaling of the bulge amount for angles between zero and 180 (e.g., a 90-degree bend may produce a bulge of X/2). The MOS deformation system may interpolate the amount of bulge to be applied to skin vertices that are between or near the vertices configured by the rigger. This allows the rigger to define bulge operations without having to manually configure each skin vertex on the bulge region.

The bulge value provided by the rigger may be defined as an "in bulge," "side bulge," or "out bulge." These bulge directions are defined relative to a reference direction. For example, an in bulge may be applied to a skin vertex on the character's biceps to cause it to extend in the inward direction at the elbow bend, a side bulge may be applied to a skin vertex of the character's brachialis to cause it to extend in a direction orthogonal to the inward direction at the elbow bend, and an out bulge may be applied to a skin vertex on the character's triceps to cause it to extend in a direction opposite the inward direction at the elbow bend. The reference direction that points in the inward direction at the MOS transform is commonly represented by a reference vector referred to as the "in vector." Traditionally, the in vector for a MOS transform is automatically calculated to be the bisection of the twist axes (e.g., a vector from previous MOS transform and a vector to the next MOS transform) of a MOS transform. This vector may be used to determine which skin vertices are on the inside of the MOS transform, outside of the MOS transform, and on the sides of the MOS transform. As such, the in vector defines when the in, out, and side bulges are applied and in which direction. It should be appreciated that the in and side, and out and side, bulges may be blended for skin vertices that are not purely along the in, out, or side directions. Additionally, in some examples, the in/out and side bulge offsets may be calculated separately and added to the skin vertex's deformed position (along with slide), while, in other examples, the in/out and slide bulges (as scalar values) may be blended and then applied as a multiplicative factor to the skin vertex's attachment vector.

Figure 4:
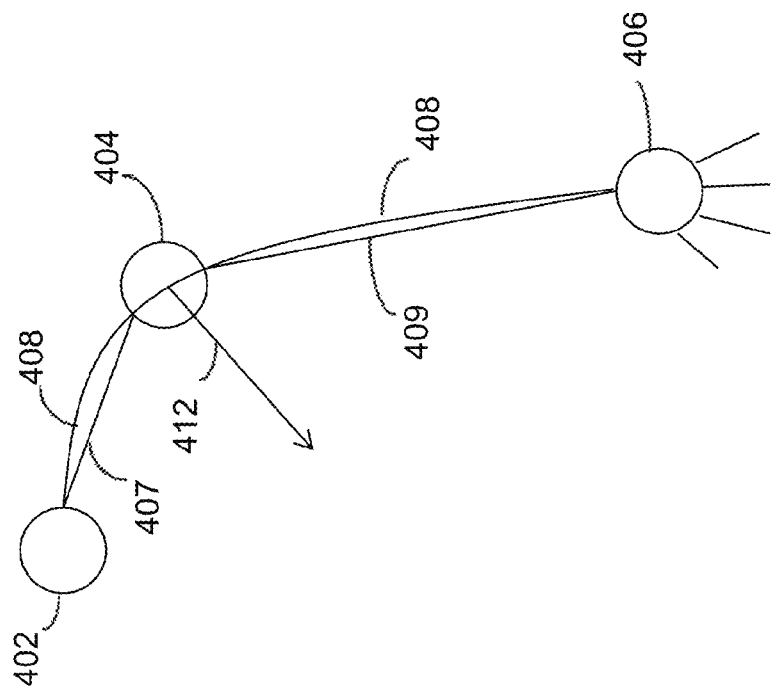
FIG. 4 illustrates a portion of a computer-generated character and the in vector created using a conventional MOS deformation technique.
Figure 5B:
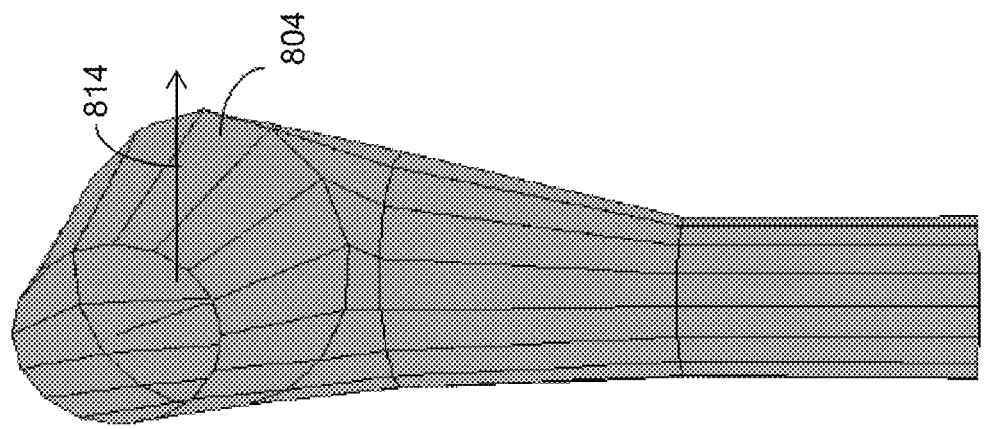
FIGS. 5A and 5B illustrate skin deformations using the in vectors of FIGS. 4 and 8, respectively.
Figure 5A:
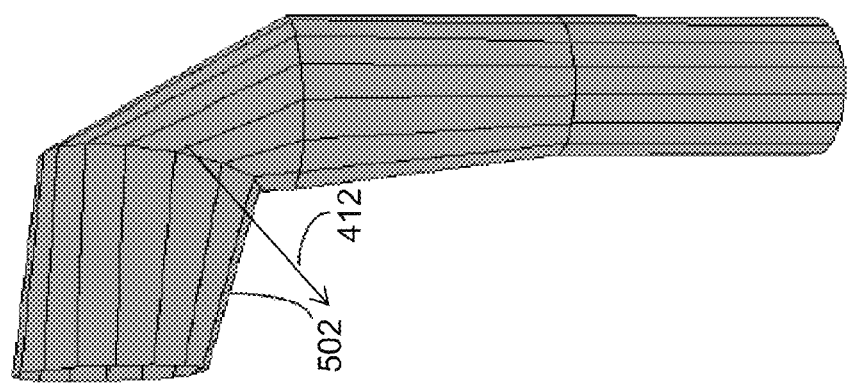

To illustrate, FIG. 4 shows an example arm 400 having MOS transforms (e.g., representing joints) 402, 404, and 406 connected together by connecting vectors 407 and 409. In this example, a skin vertex on the biceps muscle (not shown) partially surrounding MOS curve 408 may be assigned an in bulge operation that is controlled by the bend at MOS transform 404 and its associated in vector 412. As shown, in vector 412 points in the direction that bisects the twist axes at MOS transform 404. In other words, the angle formed between in vector 412 and the vector 407 connecting MOS transforms 402 and 404 is equal to the angle formed between in vector 412 and the vector 409 connecting MOS transforms 404 and 406. FIG. 5A illustrates the skin deformation resulting from the in bulge operation using in vector 412. As shown in FIG. 5A, there is a bulge 502 in the general direction of in vector 412.

While the in bulge operation resulting from the use of in vector 412 may be desirable in many situations, riggers may want to rig a character having skin that bulges in an unconventional manner. Unfortunately, current MOS deformation systems do not provide an intuitive way to create these bulges since the in vector is always defined as the bisection between twist axes at the joint. As a result, riggers may be required to create a desired bulge using a combination of different types of deformation operations.

Figure 6:
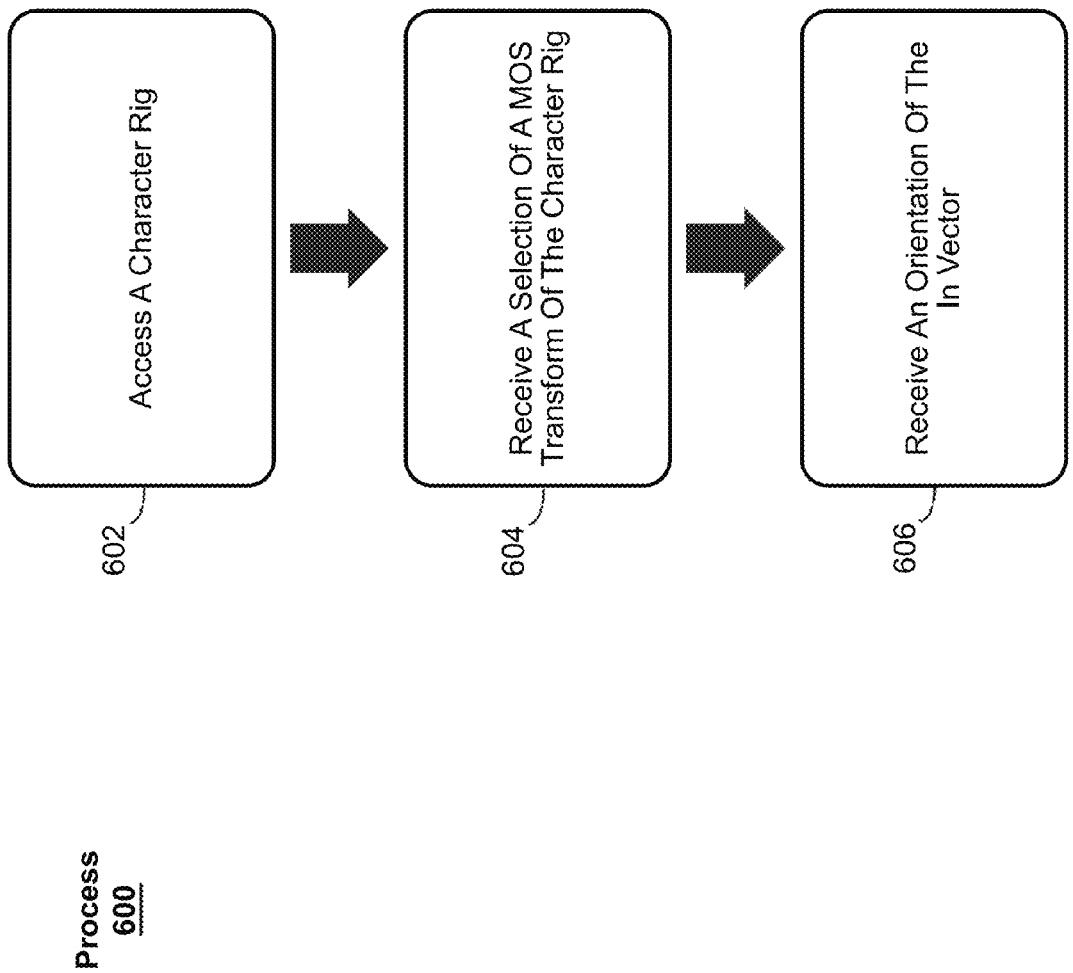
FIG. 6 illustrates an exemplary process for configuring a manual in vector according to various examples.

FIG. 6 illustrates an exemplary process 600 that may be used to configure a manual in vector. Process 600 may be preceded by other computer animation processes. For example, the rig of a computer-generated character may be controlled by a preceding process. Process 600 may also be followed by other computer animation processes. For example, once the manual in vector is configured using process 600, a MOS deformation process, such as that described above or described in U.S. Patent Publication No. 2013/0088497, which is incorporated herein by reference in its entirety for all purposes, may be performed using the manual in vector to deform the skin of a character.

Figure 7A:
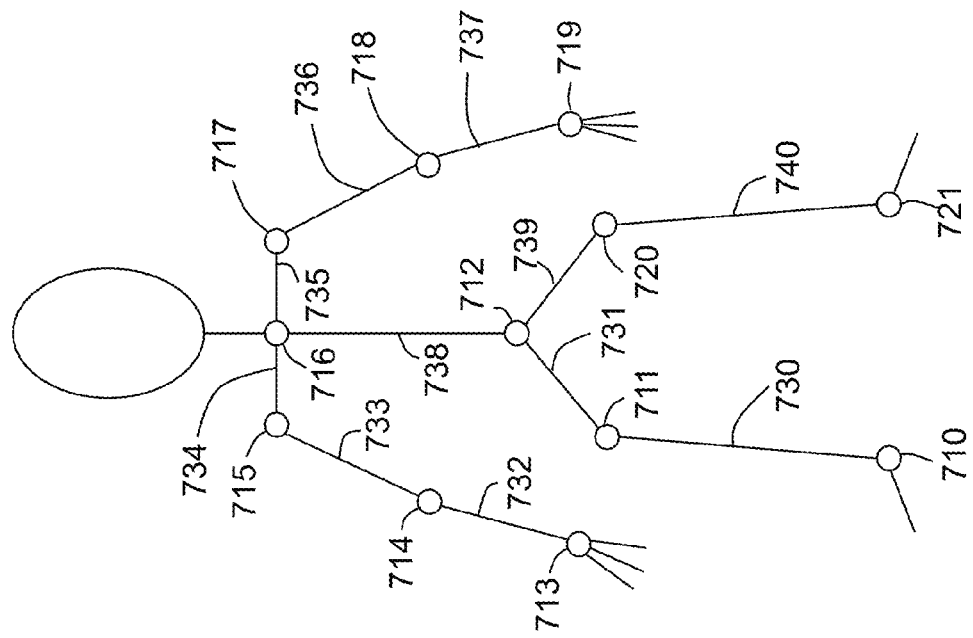
FIG. 7A illustrates an exemplary computer-generated character according to various examples.
Figure 7B:
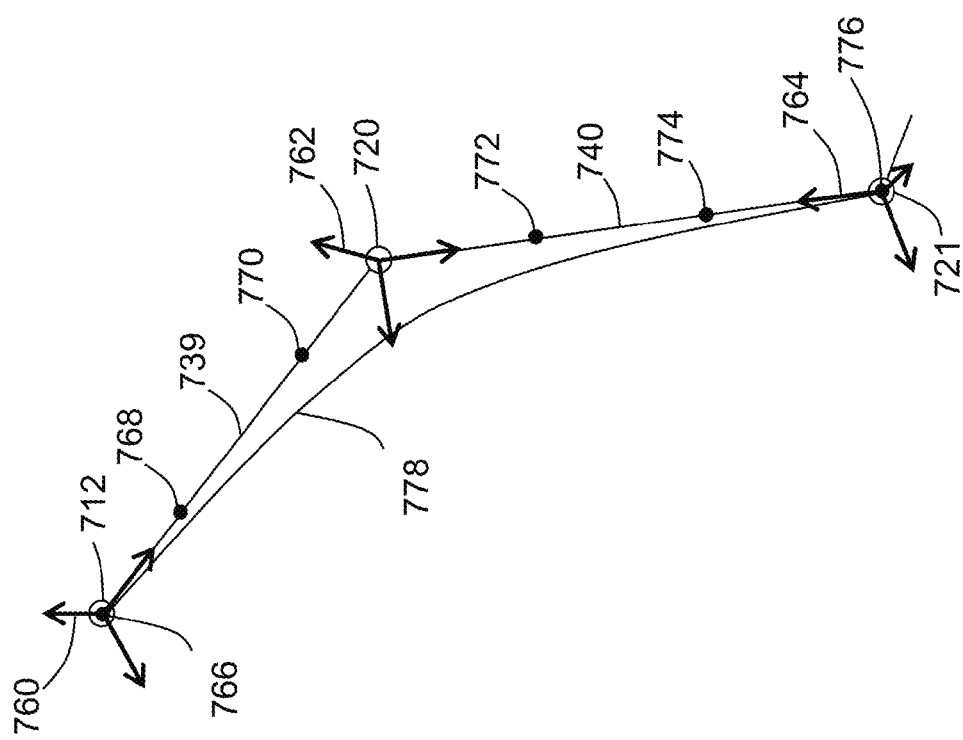
FIG. 7B illustrates another view of the computer-generated character of FIG. 7A.

At block 602, a character rig may be accessed. Generally, the charter rig may include a computer-generated character model having MOS transforms (e.g., representing joints) connected together by implicit vectors (e.g., bones), MOS curves, MOS vertices, and skin vertices. For example, FIG. 7A depicts an exemplary rig of a computer-generated character 701 in an initial pose. The rig may represent a skeleton structure comprising joints 710-721 connected together by vectors (e.g., bones) 730-740. The rig may be modeled using MOS vertices, MOS curves, and MOS transforms, where the MOS curves may rotate, or move, about a MOS transform. The skeleton structure may be used to describe the movement and the skin layer of computer-generated character 701. FIG. 7B illustrates a zoomed-in view of a leg of character 701 and the MOS vertices, MOS curves, and MOS transforms used to model the leg. As shown, the leg includes a hip joint 712, knee joint 720, and ankle joint 721 connected together by bones 739 and 740. The rig further includes a first MOS transform 760 overlaid on hip joint 712, a second MOS transform 762 overlaid on knee joint 720, and a third MOS transform 764 overlaid on ankle joint 721. A first MOS vertex 766 is overlaid on both MOS transform 760 and hip joint 712, second and third MOS vertices 768 and 770 are overlaid on bone 739, fourth and fifth MOS vertices 772 and 774 are overlaid on bone 740, and sixth MOS vertex 776 is overlaid on both MOS transform 764 and ankle joint 721. The rig further includes the MOS curve 778 generated based on MOS vertices 766, 768, 770, 772, 774, and 776. As shown, MOS curve 778 starts and ends with joints 712 and 721 (and thus, MOS vertices 766 and 776), and may or may not pass through the other MOS vertices. It should be appreciated that while these MOS vertices lie on the MOS transforms or vectors connecting the MOS transforms in FIG. 7B, in other examples, they may be positioned at other locations. A character rig similar to character rig 701 may be accessed at block 602.

At block 604, a selection of a MOS transform (e.g., representing a joint) of the character rig may be received from a user. This selection may be made using any desired user interface in any desired manner. For instance, in some examples, the user interface may include a representation of the character rig similar to that shown in FIGS. 7A and 7B and the user may highlight and select the desired MOS transform. In other examples, other user interfaces may be provided for the user to indicate a selection of the desired MOS transform.

Figure 8:
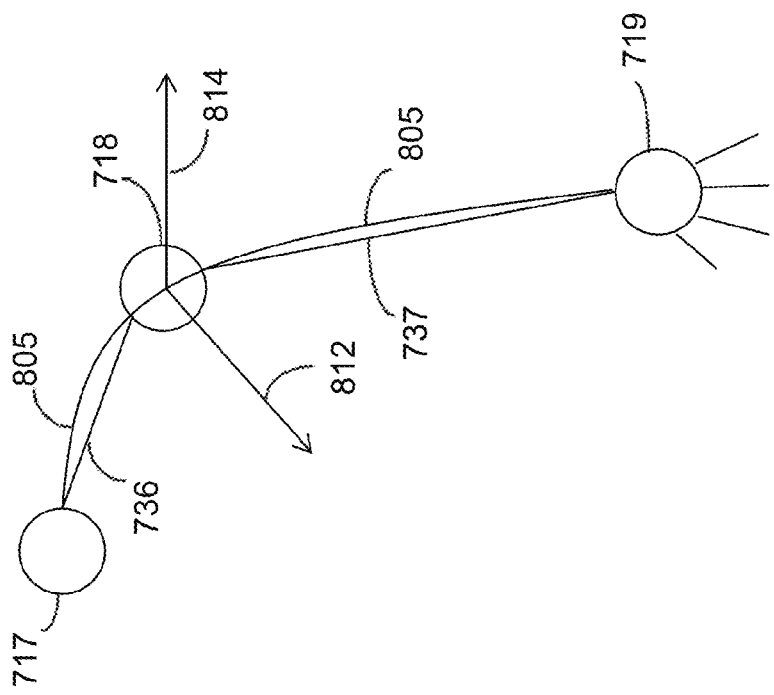
FIG. 8 illustrates a portion of a computer-generated character and the in vector created using the process of FIG. 6.

At block 606, an orientation for an in vector of the MOS transform selected at block 604 may be received from the user. In some examples, the orientation of the in vector may be static and defined in joint-space. This means that as the joint moves, so does the in vector. In these examples, the orientation of the in vector received from the user may be defined using three values (e.g., X, Y, and Z values). However, other coordinate systems may similarly be used to define the in vector. To illustrate, FIG. 8 illustrates arm 800 of character 701 having MOS transforms (not shown) located at joints 717, 718, and 719 connected together by vectors 736 and 737 and MOS curve 805. Using traditional MOS deformation techniques, the in vector for the MOS transform located at joint 718 would be in vector 812 (similar to in vector 412 of FIG. 4). This vector would be automatically computed for the MOS transform at joint 718 and unalterable by the rigger. However, using process 600, a manual in vector 814 may be generated by inputting a desired orientation of the in vector at block 606 of process 600. As shown, manual in vector 814 has been defined to point in an arbitrary sideways direction that does not bisect the angle formed between twist axes at the MOS transform at joint 718.

In some examples, blocks 604 and 606 may be repeated any number of times for any of the MOS transforms in the character rig accessed at block 602. In the absence of a user defining a manual in vector for a MOS transform, a conventional in vector that bisects the angle formed at the MOS transform may be assigned.

After completion of process 600, other computer animation processes may be performed. For example, a MOS deformation process may be performed using the manual in vector(s) configured using process 600 as an input to deform the skin of a character. Any known MOS deformation processes may be used, such as that described above or described in U.S. Patent Publication No. 2013/0088497. The MOS deformation process may generally include determining the position of the skin vertex relative to the inside of the MOS transform (as defined by the manual in vector) using the in vector and applying the bulge operation if the relative position matches the type of bulge to be applied. FIG. 5B illustrates the skin deformation resulting from the in bulge operation using in vector 814. As shown in FIG. 5B, there is a bulge 804 in the general direction of in vector 814 that is different than bulge 502 resulting from the use of a conventional in vector 412.

5. MOS Deformation Computations—TWO Xform Slide/Bulge

As mentioned above, in MOS deformation computations, the bulge operation may depend on the orientation of a MOS transform of a character rig. The slide operation may similarly depend on the orientation of the MOS transform of the character rig. For example, as the character bends its elbow inward, the biceps muscle may slide away from the elbow joint. When rigging a character, the rigger may assign numerical values to skin vertices (via MOS vertices) on the character's skin that represent the amount of slide desired when a relevant MOS transform (e.g., the elbow joint) is moved. For example, the rigger may specify that a skin vertex (via one or more MOS vertices) on the biceps should slide by a maximum amount Y in response to a bending of the elbow. As a result, the skin vertex may experience no slide when the elbow is at rest (e.g., when the arm is fully extended), may experience the full Y slide amount when the elbow is completely bent (e.g., a 180-degree bend), and may experience a linear scaling of the slide amount for angles between zero and 180 (e.g., a 45-degree bend may produce a bulge of Y/4). The MOS deformation system may interpolate the amount of slide to be applied to skin vertices that are between or near the vertices configured by the rigger. This allows the rigger to define slide operations without having to manually configure each skin vertex on the slide region.

While controlling the amount of bulge and slide using a single MOS transform may be used to create believable skin deformations, it limits the realism that can be achieved by the riggers and animators since the amount that real skin bulges and slides may depend on more than one MOS transform. For example, the amount that a biceps bulges or slides may depend primarily on the angle of the elbow but may also partially depend on the angle of the wrist.

FIG. 9 illustrates an exemplary process 900 for configuring a skin deformation that depends on multiple MOS transforms. Process 900 may be preceded by other computer animation processes. For example, the rig of a computer-generated character may be created in a preceding process. Process 900 may also be followed by other computer animation processes. For example, once a MOS deformation is configured using process 900, a MOS deformation process, such as that described above or described in U.S. Patent Publication No. 2013/0088497, may be performed using the configured MOS deformation.

At block 902, a character rig may be accessed. Block 902 may be similar or identical to block 602 of process 600. For example, a character rig similar or identical to that of character 701 may be accessed.

At block 904, a selection of a MOS vertex of the character rig may be received from a user. This selection may be made using any desired user interface. For example, the user interface may display MOS vertices surrounding the MOS curves and transforms of the character rig and the user may highlight and select a desired MOS vertex on the user interface. A checkbox or other selection mechanism may be provided to allow the user to indicate whether or not the deformation operation for the MOS vertex is to depend on one or multiple MOS transforms. If a selection is made to cause the deformation operation to depend on multiple MOS transforms, the process may proceed to block 906. However, other user interfaces may be provided for the user to indicate a selection of the desired MOS vertex.

To illustrate, continuing with the example provided above, a representation of character rig containing MOS vertices, MOS curves, and/or MOS transforms may be displayed for the arm of character 701. The user may highlight and click a MOS vertex near the character's biceps muscle on his left arm using the interface provided at block 904.

At block 906, selections of two or more MOS transforms may be received from the user. The two or more MOS transforms may represent the joints that are to be used to control the slide or bulge of the MOS vertex selected at block 904. The selection may be made using any desired user interface. For example, the user interface may include a representation of the character rig and the user may highlight and select the MOS transforms. However, other user interfaces may be provided for the user to indicate a selection of the desired MOS transforms.

To illustrate, continuing with the example provided above, a representation of character rig containing MOS vertices, MOS curves, and/or MOS transforms may be displayed for the arm of character 701. The user may select two or more MOS transforms by highlighting and clicking the elbow joint of the human character's left arm and the wrist joint of the human character's left arm.

At block 908, a slide or bulge value (and slide or bulge type, such as out slide, in slide, in bulge, out bulge, side bulge) for the MOS vertex selected at block 904 may be received. For example, the user may specify that the maximum bulge for the MOS vertex selected at block 904 is X amount. Additionally, the user may also provide weightings for each of the two or more MOS transforms selected at block 906. These values may be expressed as percentages, fractions, or the like, and may represent the relative amount of bulge attributable to the MOS transform. For example, a weighting of 90% may be assigned to the MOS transform representing the elbow of the character and a weighting of 10% may be assigned to the MOS transform representing the wrist of the character. These weightings may be used to determine the percentage of the maximum bulge amount X attributable to each of the selected MOS transforms. The total bulge may be computed as a sum total of the individual bulges for each of the selected MOS transforms. Slide values and weightings may alternatively be provided and the total slide may be calculated in a similar manner.

To illustrate, continuing with the example provided above, the user may assign an out bulge value of 2 to the MOS vertex of the biceps selected at block 904. The user may further assign a weight of 90% to the MOS transform representing the elbow joint selected at block 906 and a weight of 10% to the MOS transform representing the wrist joint selected at block 906. As a result, 90% of the bulge (0.9*2=1.8) may be determined based on the position of the elbow joint while 10% of the bulge (0.1*2=0.2) may be determined based on the wrist joint. Thus, if the elbow is bent 90 degrees (bulge of 1.8/2=0.9) and the wrist is bent 45 degrees (bulge of 0.2/4=0.05), the total bulge for the MOS vertex may be 0.95.

In some examples, the two or more MOS transforms selected at block 906 may control both the slide and bulge operations. In other examples, blocks 906 and 908 may be repeated to separately configure the slide or bulge of the MOS vertex selected at block 904. For example, if blocks 906 and 908 were performed to configure the bulge of the MOS vertex, blocks 906 and 908 may be repeated to configure the slide of the MOS vertex, or vice versa. It should be appreciated that the MOS transforms selected at block 906 for slide and bulge need not be the same. For example, a slide operation may depend on a first transform and a second transform, while a bulge operation may depend on the first transform and a third transform. Additionally, if the slide and bulge operations depend on the same transforms, the weightings assigned to the transforms for slide and bulge need not be the same. For example, the slide operation may depend 80% on the first transform and 20% on the second transform, while the bulge operation may depend 60% on the first transform and 40% on the second transform.

Blocks 904, 906, and 908 may also be repeated any number of times to configure the slide and/or bulge of additional MOS vertices of the character rig accessed at block 902.

Figure 10B:
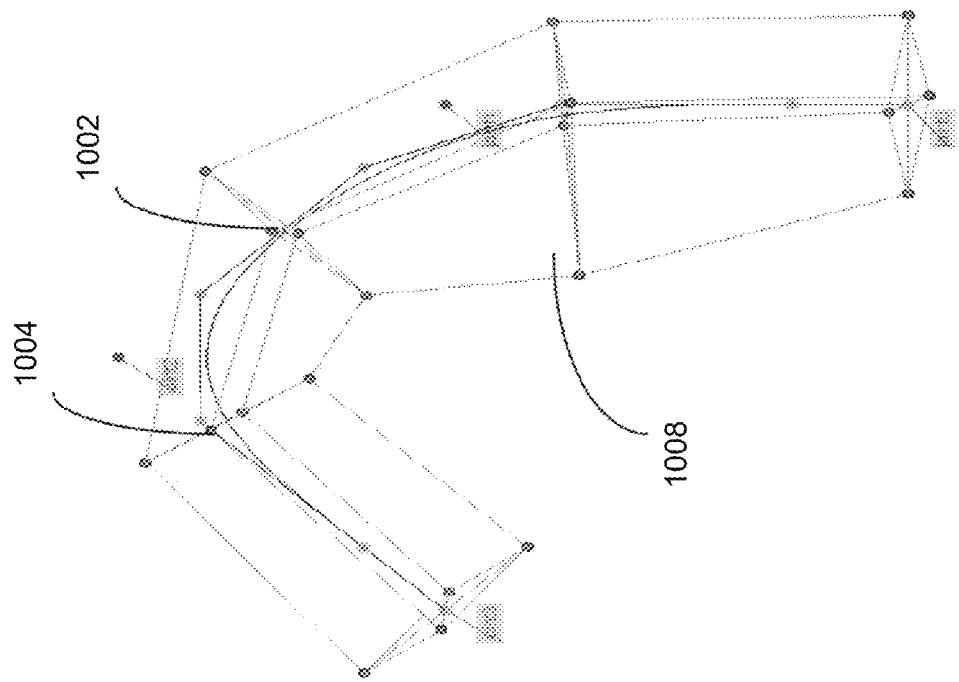
FIGS. 10A and 10B illustrate skin deformations that depend on one MOS transform and two MOS transforms, respectively.
Figure 10A:
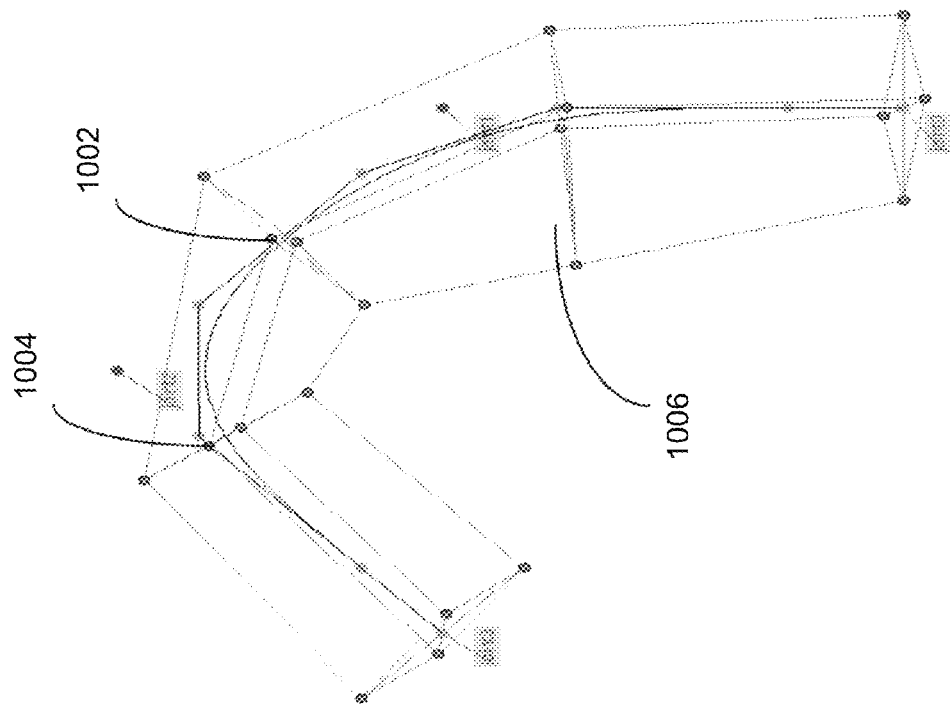

After completion of process 900, other computer animation processes may be performed. For example, a MOS deformation process may be performed using the slide or bulge operations configured using process 900 as an input to deform the skin of a character. Any known MOS deformation processes may be used, such as that described above or described in U.S. Patent Publication No. 2013/0088497. FIG. 10A illustrates the skin deformation resulting from an in bulge operation that depends only on MOS transform 1002, while FIG. 10B illustrates the skin deformation resulting from an in bulge operation depending on both MOS transform 1002 and 1004. As shown, the bulge 1008 generated using an in bulge operation that depends on two MOS transforms is larger than the bulge 1006 generated using an in bulge operation that depends on one MOS transform.

While the example provided above uses two MOS transforms to control bulge/slide operations, it should be appreciated that process 900 may be used to configure MOS vertices based on any number of MOS transforms. Additionally, process 900 may be used in combination with any of the other processes described herein. For example, a skin deformation that depends on multiple MOS transforms may be configured using process 900 and a manual in vector may be configured using process 600. These can be used as inputs to a MOS deformation system and used to calculate a skin deformation for a character.

6. MOS Deformation Computations—Tri-Ortho Slide Bulge

Figure 11:
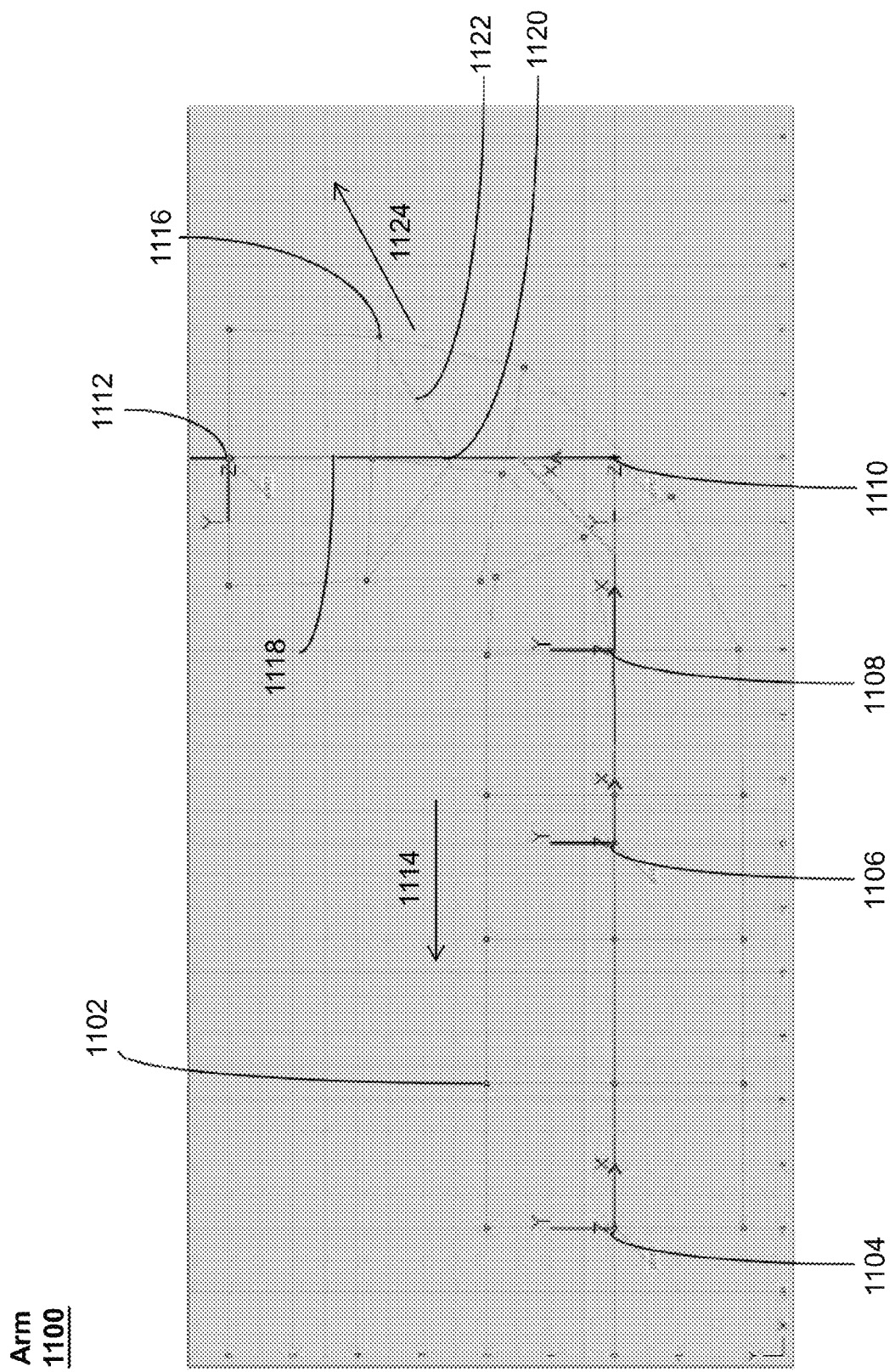
FIG. 11 illustrates a portion of a computer-generated character generated without applying any slide or bulge deformations.

In MOS deformation computations, the slide operation is typically applied in a direction that is parallel to the twist axis of a vertex's associated transform. For example, FIG. 11 shows an example illustration of an arm 1100 having skin vertices (represented by dots); MOS transforms 1104, 1106, 1108, 1110, and 1112; and MOS curve 1118. If vertex 1102 (via one or more MOS vertices) is configured to have a slide operation associated with transform 1110, the slide deformation may be applied in direction 1114.

Figure 12:
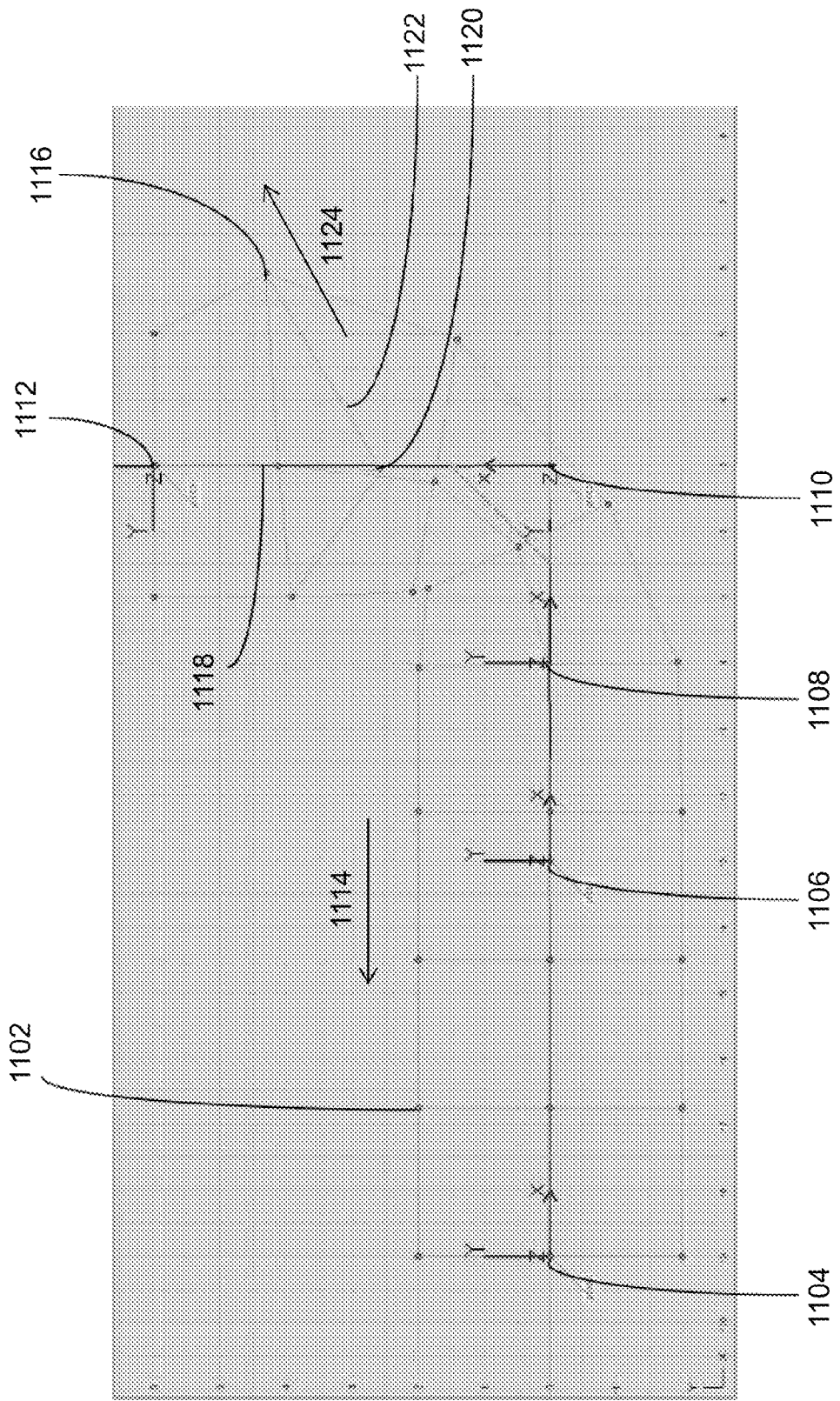
FIG. 12 illustrates a portion of a computer-generated character generated with an out bulge applied along an attachment vector.

A bulge operation, however, is typically applied in a direction along the vector pointing from a vertex's attachment point on a MOS curve to the vertex. In many instances, the vector pointing from the vertex's attachment point to the vertex will be orthogonal to the MOS curve. As a result, the slide operation is typically applied in a direction orthogonal to the bulge operation. However, in some instances, the vector pointing from the vertex's attachment point to the vertex may not be orthogonal to the MOS setup's twist axis. For example, as shown in FIG. 11, skin vertex 1116 is attached to MOS curve 1118 at attachment point 1120 by attachment vector 1122. Using conventional MOS bulge deformation techniques, if vertex 1116 is configured to have an out bulge operation associated with transform 1110, the bulge deformation may be applied in direction 1124, which extends from attachment point 1120 to vertex 1116. The resulting bulge is illustrated in FIG. 12. As can be seen, an irregular upward bulge that may be undesirable in certain instances is generated. This can be problematic because riggers may want to generate an out bulge that extends in an orthogonal outward direction. Instead, a skewed bulge similar to that shown in FIG. 12 may be generated. Additionally, in extreme cases where the attachment vector points in a direction similar to the MOS twist axis, the bulge transform may cause the vertex to appear to slide more than bulge. In these instances when using conventional MOS deformation techniques, the rigger may be required to offset the movement of the vertex in the direction parallel to the MOS curve using a slide deformation in the opposite direction. This is time consuming and unintuitive for riggers.

Figure 13:
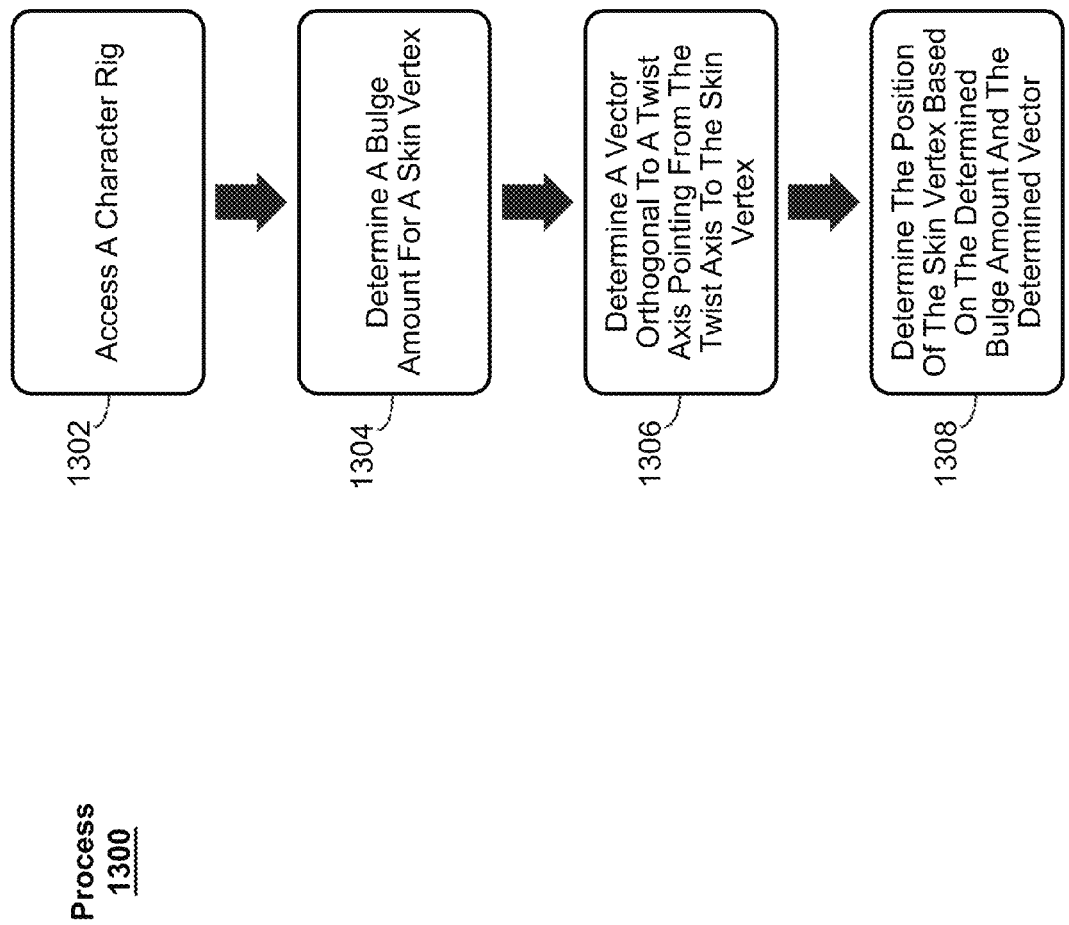
FIG. 13 illustrates an exemplary process for performing a bulge deformation according to various examples.

FIG. 13 illustrates an exemplary process 1300 that may be used to compute bulge deformations. MOS deformation process 1300 may be preceded by other computer animation processes. For example, the rig of a computer-generated character may be created in a preceding process. MOS deformation process 1300 may also be followed by other computer animation processes. For example, once the deformation calculation is performed using process 1300, a subsequent rendering process may be performed.

At block 1302, a character rig may be accessed. Block 1302 may be similar or identical to block 602 or 902 of process 600 or 900. For example, a character rig similar or identical to that of character 701 may be accessed.

At block 1304, a bulge amount for a skin vertex of the character rig may be calculated. The bulge amount may be determined based on the maximum bulge values assigned to the one or more MOS vertices that affect the skin vertex and the orientation of the associated MOS transform(s). If the bulge operation for the one or more MOS vertices were configured using process 900 to depend on more than one MOS transform, a sum of the weighted contributions from each of the MOS transforms may be calculated to determine the bulge amount for each MOS vertex, as described above with respect to FIG. 9.

For example, if the character rig associated with arm 1100 of FIG. 11 was accessed at block 1302 and the bulge operation assigned one or more MOS vertices that control vertex 1116 depend on both MOS transforms 1110 and 1112, the bulge amount for vertex 1116 may be determined based on orientations of MOS transforms 1110 and 1112 at block 1304. The bulge contribution for each of MOS transforms 1110 and 1112 may be calculated based on the maximum bulge assigned to the one or more MOS vertices that control vertex 1116, the relative weights of the MOS transforms, and the positions of the MOS transforms, as discussed above with respect to FIG. 9.

At block 1306, a vector that is orthogonal to the twist axis of the MOS transform associated with the skin vertex and that points to the vertex may be determined using known mathematical calculations, such as by computing the vector cross product to obtain three mutually orthogonal vectors. For example, continuing with the example above, a vector orthogonal to the twist axis associated with the MOS transform associated with skin vertex 1116 (e.g., MOS transform 1110) and that points to vertex 1116 may be determined. By default, the twist axis may be the vector between the MOS transform in question (e.g., MOS transform 1110) and the next MOS transform in the chain (e.g., MOS transform 1112). The vector that is orthogonal to this twist axis is illustrated by vector 1426 in FIG. 14.

At block 1308, the position of the skin vertex may be determined based on the bulge amount determined at block 1304 and the orthogonal vector determined at block 1306. For example, the position of the vertex may be determined to be a point along the orthogonal vector determined at block 1306 that is a distance corresponding to the bulge amount determined at block 1304 away from the attached MOS curve. The bulge may be applied in the direction determined at block 1306 regardless of the direction of the attachment vector between the vertex and the MOS curve. This may advantageously produce predictable bulge deformations that intuitively look like a bulge extending orthogonally away from the MOS curve. Using process 1300, riggers and animators may predictably use slide and bulge MOS deformations to move skin volumes along the MOS curves and away from the MOS curves, respectively.

Figure 14:
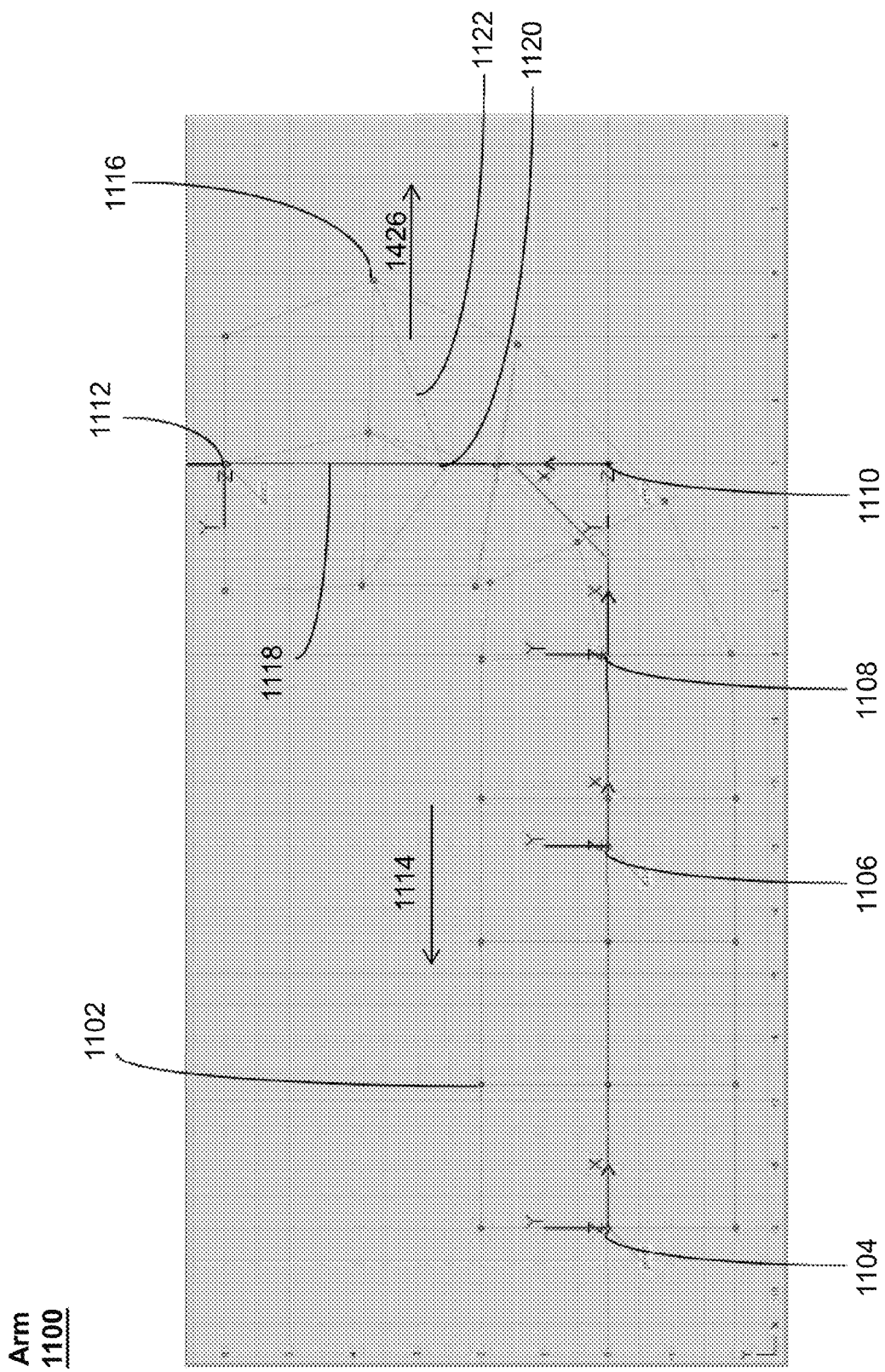
FIG. 14 illustrates a portion of a computer-generated character having an out bulge deformation applied using the process of FIG. 13.

To illustrate, continuing with the example above, FIG. 14 shows a bulge deformation performed on vertex 1116 using process 1300. As shown, vertex 1116 has been moved in the direction of vector 1426, which is orthogonal to the twist axis between MOS transforms 1112 and 1110, resulting in a bulge deformation that is not skewed like the deformation shown in FIG. 12 using conventional MOS deformation techniques.

Blocks 1304, 1306, and 1308 may be repeated any number of times to determine the positions of other vertices of the character rig accessed at block 1302 caused by bulge operations.

It should be appreciated that process 1300 may be used in combination with any of the other processes described herein. For example, a skin deformation (e.g., a bulge operation) that depends on multiple MOS transforms may be configured using process 900 and a manual in vector may be configured using process 600. These can be used as inputs to process 1300, which may apply the configured bulge operation in a direction that is orthogonal to the attached MOS curve.

7. MOS Deformation Computations—Closed Curves

Many MOS structures, such as fingers, arms, legs, etc., form open curves. These open curves may be characterized by having a start and an end that do not meet at a common point. In other words, these open curves do not connect together to form a loop. However, these open curves may not always be sufficient to animate objects containing loops, such as belts, rings, the ring of skin vertices around the eye, etc. Thus, it may be desirable to represent objects using a closed curve having a start and an end that connect together to form a loop. However, processing closed curves may be problematic when performing skin deformations using conventional MOS deformation techniques due to the way the deformations are calculated.

Figure 15:
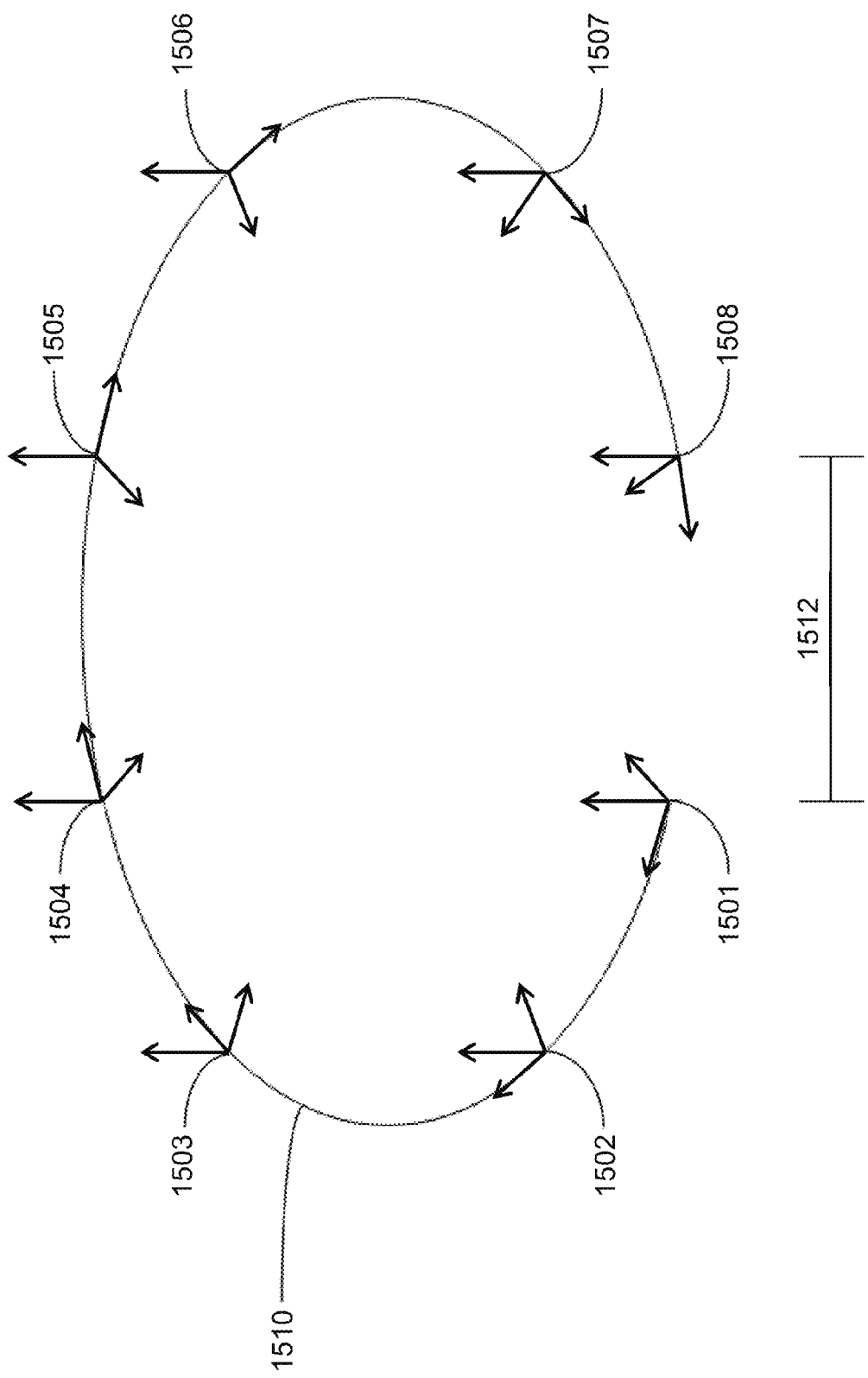
FIG. 15 illustrates an exemplary open MOS curve.
Figure 16:
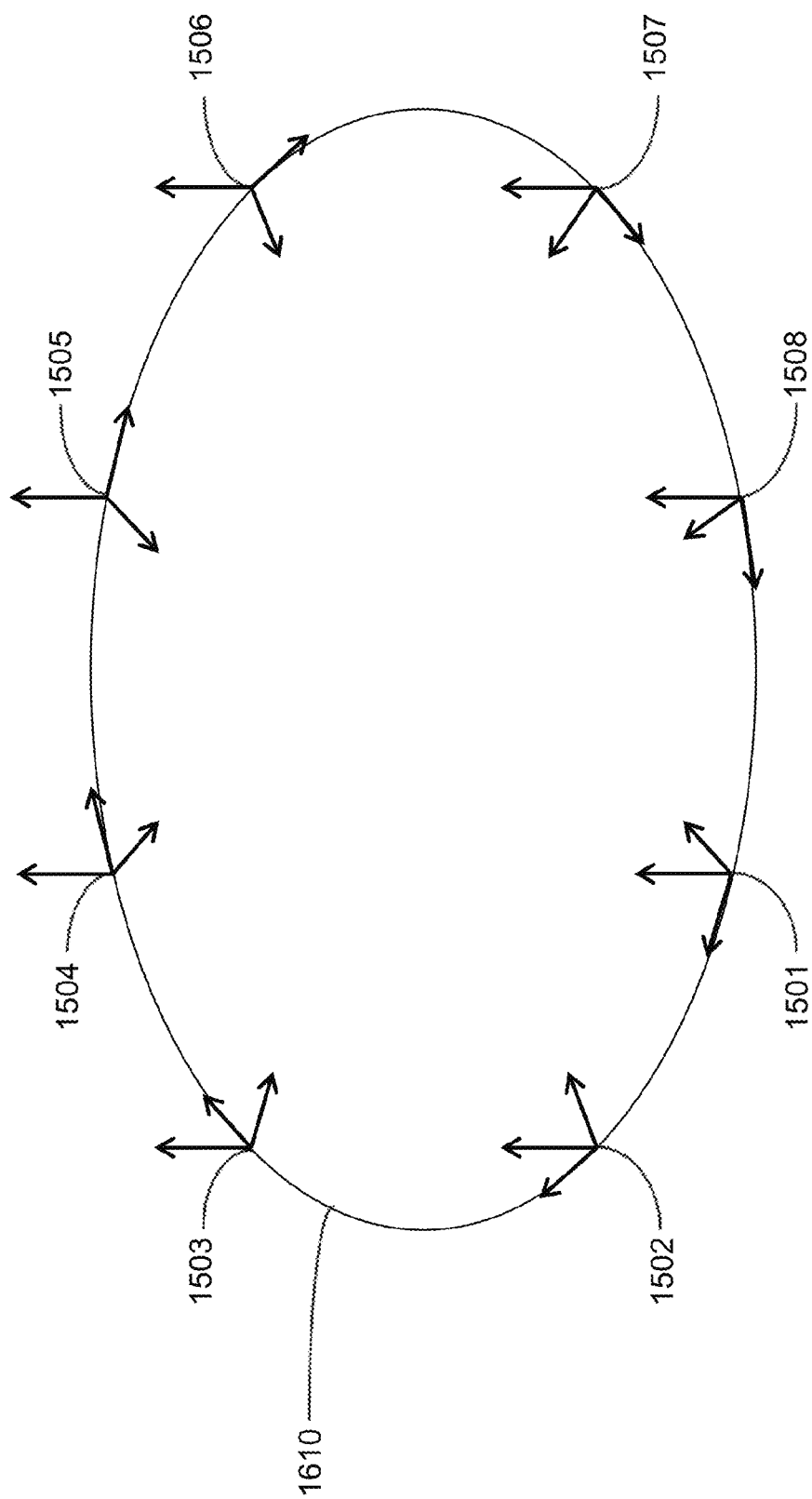
FIG. 16 illustrates an exemplary closed MOS curve.

To illustrate, FIG. 15 depicts an example open MOS curve 1510, the shape of which is determined by MOS vertices (not shown). The positions of the MOS vertices may be controlled by MOS transforms 1501-1508. In this illustrated example, MOS curve 1510 has an open shape since a MOS vertex coincident with MOS transform 1501 is not connected to a MOS vertex coincident with MOS transform 1508 (e.g., by virtue of a "closed" flag not being set). The result is the formation of a gap 1512 between MOS transforms 1501 and 1508. FIG. 16 illustrates an example closed curve 1610 formed from the same MOS transforms 1501-1508 and MOS vertices. However, the MOS vertices coincident with MOS transforms 1501 and 1508 may be connected together (e.g., by virtue of a "closed" flag being set), resulting in MOS curve 1610 having a closed shape.

When performing a MOS deformation, frames representing spatial orientations expressed as either quaternions or transforms may be calculated. These frames may be calculated by first determining the twist axes for the MOS transforms. A twist axis may be the vector connecting one MOS transform to the next MOS transform. Using these twist axes, base frames for each MOS transform may be calculated by determining the free space rotation between an incoming twist axis and an outgoing twist axis at each transform in rest position. This rest position represents a starting position for the closed curve. For example, a rest position for a belt may be an untwisted ovular shape. The base frames may be sequentially calculated at each MOS transform and may be expressed with reference to the preceding base frame. For example, the determined free space rotation between an incoming twist axis and an outgoing twist axis may be applied to a base frame of a preceding transform to obtain the base frame for the present transform.

To illustrate using curve 1510 shown in FIG. 15 as an example, the calculation of base frames may begin with transform 1501. To calculate the base frame for the first transform 1501, a free space rotation between transform 1501 and its reference frame may be calculated. The base frames for the remaining transforms may be calculated by determining the free space rotation between the incoming twist axis and the outgoing twist axis for each transform. For example, the base frame for transform 1502 may be calculated by determining the free space rotation between its incoming twist axis (e.g., vector connecting transform 1501 and 1502) and the outgoing twist axis (e.g., vector connecting transform 1502 and 1503). Similar determinations may be made for each of the remaining base frames at transforms 1503-1508.

After performing the calculations for the base frames, delta twist and orientations may be calculated for each of the transforms. These delta twist and orientations may represent the decomposition of the change in orientation between the current version of a transform and the transform in the rest position into a scalar twist rotation about the twist axis and a remaining change in orientation. An exception may be made for the first transform, which may be assigned a delta twist value of zero. Thus, the change in orientation for the first transform may be entirely attributed to the orientation component of the decomposition. An example process for decomposing a change in orientation into a delta twist and orientation is described by Shoemake, Ken, Fiber Bundle Twist Reduction, Graphics Gems IV, p. 230-236. Using the base frames and delta twists and orientations, the final frames may be calculated on a per-MOS-vertex basis using the MOS vertex's associated parent MOS transform and per-MOS-vertex twist and scale information blended using weighting coefficients determined by the parameter of a skin vertex's attachment to the MOS curve, as described above.

When this process is applied to a MOS curve (open or closed), an asymmetry may be introduced into the curve due to the arbitrary assignment of zero twist to the first transform. In open curves, this asymmetry may be acceptable since there may be no expectation of symmetry. For example, a twist operation performed at MOS transform 1501 in FIG. 15 may not be expected to behave in the same manner as a twist operation performed at MOS transform 1505 since MOS transform 1501 is connected to only one other MOS transform while MOS transform 1505 is connected to two other MOS transforms. In a closed curve example, however, there may be an expectation of symmetry. For example, as shown in FIG. 16, a twist operation performed at MOS transform 1501 may be expected to behave in the same manner as a twist operation performed at MOS transform 1505 since both MOS transforms are connected to the same number of MOS transforms in the same relative positions to each other. Thus, calculating deformations in this way on a closed curve may produce undesirable results.

FIG. 17 illustrates an exemplary process 1700 for computing a skin deformation of a closed curve. At block 1702, a closed MOS curve may be accessed. The closed MOS curve may include MOS transforms sequentially connected together. The MOS transforms may be connected together such that they form a loop similar to that of curve 1610 shown in FIG. 16.

At block 1704, a ghost transform (e.g., a duplicate transform) may be generated and placed at the location of the first transform of the closed curve accessed at block 1702. The ghost transform may be an additional transform that has the same position and orientation as the first transform and may include a ghost connection to the last transform of the closed curve. To illustrate, using curve 1610 of FIG. 16 as an example, transform 1501 may be the first transform of closed curve 1610. An additional transform (not shown) overlapping transform 1501 may be inserted into the curve and may be connected to transform 1508 (but not transform 1502).

At block 1706, base frames and delta twists and orientations of the transforms of the MOS closed curve and the ghost transform may be calculated. This may include calculating twist axes for the MOS transforms and sequentially calculating the base frames based on the twist axes with reference to a preceding transform, as described above. For example, the base frame for transform 1502 may be calculated with reference to the base frame for transform 1501, the base frame for transform 1503 may be calculated with reference to the base frame for transform 1502, and so on until the base frame for ghost transform is calculated with reference to the base frame for the last transform (transform 1508). Once the base transforms are calculated, a delta twist and orientation decomposition may be performed on the transforms. As discussed above, this may include decomposing the change in orientation between the current version of the transform and the transform in the rest position into a scalar twist rotation about the twist axis and a remaining change in orientation.

At block 1708, the base frames and delta twists and orientations determined at block 1706 may be used as inputs to a MOS deformation system to calculate a skin deformation, as described above. However, when computing the deformation of skin vertices attached to the MOS curve in the region between 1508 and 1501, the base frame and delta twist and orientation of the ghost transform are used in preference to those associated with the original MOS transform 1501 which has its delta twist set to zero, as described above.

It should be appreciated that process 1700 may be used in combination with any of the other processes described herein. For example, within a MOS closed curve, such as closed curve 1610, skin deformation (e.g., a bulge operation) that depends on multiple MOS transforms may be configured using process 900 and a manual in vector may be configured using process 600. The configured MOS closed curve may be accessed at block 1702 of process 1700. A modified version of process 1300 may further be used in combination with process 1700 to determine a skin deformation generated from a bulge operation applied in a direction orthogonal to the attached MOS curve, as described above with respect to FIG. 13. However, when computing the deformation of skin vertices attached to the MOS curve in the region between 1508 and 1501, the base frame and delta twist and orientation of the ghost transform are used in preference to those associated with the original MOS transform 1501 which has its delta twist set to zero, as described above.

FIG. 18 depicts an exemplary computing system 1800 with a number of components that may be used to perform the above-described processes. The main system 1802 includes a motherboard 1804 having an input/output ("I/O") section 1806, one or more central processing units ("CPU") 1808, and a memory section 1810, which may have a flash memory card 1812 related to it. The I/O section 1806 is connected to a display 1824, a keyboard 1814, a disk storage unit 1816, and a media drive unit 1818. The media drive unit 1818 can read/write a computer-readable medium 1820, which can contain programs 1822 or data.

At least some values based on the results of the above-described processes can be saved for subsequent use. Additionally, a non-transitory computer-readable storage medium can be used to store (e.g., tangibly embody) one or more computer programs for performing any one of the above-described processes by means of a computer. The computer program may be written, for example, in a general-purpose programming language (e.g., Pascal, C, C++) or some specialized application-specific language.

Various exemplary embodiments are described herein. Reference is made to these examples in a non-limiting sense. They are provided to more broadly illustrate applicable aspects of the disclosed technology. Various changes may be made and equivalents may be substituted without departing from the true spirit and scope of the various embodiments. In addition, many modifications may be made to adapt a particular situation, material, composition of matter, process, process act(s), or step(s) to the objective(s), spirit, or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments.

What is claimed is:

1. A computer-implemented method for configuring a skin deformation for a computer-animated character, the method comprising:
accessing, by one or more processors, a character rig representing the animated character and comprising a plurality of bones connected at one or more joints, a plurality of joint transforms, a plurality of control points, and a plurality of skin vertices;

receiving, by the one or more processors, a selection of a joint transform of the plurality of joint transforms,
wherein a bulge skin deformation operation of at least one control point of the plurality of control points is controlled by the selected joint transform;

receiving, by the one or more processors, input representing user selection of an orientation of a reference vector assigned to the selected joint transform,
wherein a bulge direction of the bulge skin deformation operation of the at least one control point depends on the orientation of the reference vector;

determining, by the one or more processors, a deformed position of at least one skin vertex of the plurality of skin vertices by calculating the bulge skin deformation operation of the at least one control point based on the orientation of the reference vector; and displaying skin of at least a portion of the computer-animated character, wherein the displayed skin includes skin at the deformed position of the at least one skin vertex.

2. The method of claim 1, wherein the at least one control point is associated with an in bulge value, an out bulge value, and a side bulge value, and wherein calculating the bulge skin deformation operation of the at least one control point comprises calculating a bulge amount and the bulge direction based on the in bulge value, the out bulge value, the side bulge value, and the orientation of the reference vector.

3. The method of claim 1, wherein the orientation of the reference vector comprises a set of three-dimensional coordinates that are referenced with respect to an orientation of the selected joint transform.

4. The method of claim 1, wherein the character rig further comprises:
a first twist axis between the selected joint transform and a first adjacent joint transform; and
a second twist axis between the selected joint transform and a second adjacent joint transform, wherein the reference vector is non-overlapping with a bisection of the first twist axis and the second twist axis.

5. A computer-implemented method for calculating a skin deformation for a computer-animated character, the method comprising:
accessing, by one or more processors, a character rig representing the animated character and comprising a plurality of bones connected at one or more joints, a plurality of joint transforms, a plurality of control points, and a plurality of skin vertices;
receiving, by the one or more processors, a selection of a control point of the plurality of control points;
receiving, by the one or more processors, a selection of two or more joint transforms of the plurality of joint transforms;
receiving, by the one or more processors, input representing user selection of a value for a skin deformation operation of the selected control point, wherein the skin deformation operation is controlled by the selected two or more joint transforms;
receiving, by the one or more processors, a weight value for each of the two or more joint transforms, wherein the weight values represent relative amounts that each of the two or more joint transforms contribute to the skin deformation operation;
determining, by the one or more processors, a deformed position of at least one skin vertex of the plurality of skin vertices by calculating the skin deformation operation of the selected control point based on the value for the skin deformation operation and the weight values for the two or more joint transforms; and
displaying skin of at least a portion of the computer-animated character, wherein the displayed skin includes skin at the deformed position of the at least one skin vertex.

6. The method of claim 5, wherein the skin deformation operation comprises a bulge operation or a slide operation.

7. The method of claim 5, wherein calculating the skin deformation operation of the selected control point based on the value for the skin deformation and the weight values for the two or more joint transforms comprises:
determining, by the one or more processors, a skin deformation contribution for each of the two or more joint transforms by multiplying the value for the skin deformation operation by each of the weight values; and
calculating a sum of the determined skin deformation contributions.

8. A computer-implemented method for calculating a skin deformation for a computer-animated character, the method comprising:
accessing, by one or more processors, a character rig representing the animated character and comprising a plurality of bones connected at one or more joints, a plurality of joint transforms, a plurality of control points, and a plurality of skin vertices;
determining, by the one or more processors, a bulge amount of a bulge skin deformation operation of a control point of the plurality of control points,
wherein the bulge skin deformation operation is controlled by a joint transform of the plurality of joint transforms, and
wherein the bulge amount represents a distance between a skin vertex and a twist axis between the joint transform and an adjacent joint transform of the plurality of joint transforms;
determining, by the one or more processors, a vector that is orthogonal to the twist axis, wherein the vector passes through the skin vertex and the twist axis;
determining, by the one or more processors, a position of the skin vertex based on the determined bulge amount and the determined vector; and
displaying skin of at least a portion of the computer-animated character, wherein the displayed skin includes skin at the determined position of the skin vertex.

9. The method of claim 8, wherein determining the bulge amount comprises determining an orientation of the joint transform, and wherein the bulge amount depends on the determined orientation of the joint transform.

10. The method of claim 8, wherein the skin vertex is associated with the twist axis by an attachment vector that is not orthogonal to the twist axis.

11. The method of claim 8, wherein the determined position of the skin vertex is a position along the vector that is a distance equal to the bulge amount away from the twist axis.

12. A non-transitory computer-readable storage medium comprising computer-executable instructions for configuring a skin deformation for a computer-animated character, the computer-executable instructions comprising instructions for:
accessing, by one or more processors, a character rig representing the animated character and comprising a plurality of bones connected at one or more joints, a plurality of joint transforms, a plurality of control points, and a plurality of skin vertices;

receiving, by the one or more processors, a selection of a joint transform of the plurality of joint transforms,
  wherein a bulge skin deformation operation of at least one control point of the plurality of control points is controlled by the selected joint transform;
receiving, by the one or more processors, input representing user selection of an orientation of a reference vector assigned to the selected joint transform,
  wherein a bulge direction of the bulge skin deformation operation of the at least one control point depends on the orientation of the reference vector;
determining, by the one or more processors, a deformed position of at least one skin vertex of the plurality of skin vertices by calculating the bulge skin deformation operation of the at least one control point based on the orientation of the reference vector; and
displaying skin of at least a portion of the computer-animated character, wherein the displayed skin includes skin at the deformed position of the at least one skin vertex.

13. The non-transitory computer-readable storage medium of claim 12, wherein the at least one control point is associated with an in bulge value, an out bulge value, and a side bulge value, and wherein calculating the bulge skin deformation operation of the at least one control point comprises calculating a bulge amount and the bulge direction based on the in bulge value, the out bulge value, the side bulge value, and the orientation of the reference vector.

14. The non-transitory computer-readable storage medium of claim 12, wherein the orientation of the reference vector comprises a set of three-dimensional coordinates that are referenced with respect to an orientation of the selected joint transform.

15. The non-transitory computer-readable storage medium of claim 12, wherein the character rig further comprises:
  a first twist axis between the selected joint transform and a first adjacent joint transform; and
  a second twist axis between the selected joint transform and a second adjacent joint transform, wherein the reference vector is non-overlapping with a bisection of the first twist axis and the second twist axis.

16. A non-transitory computer-readable storage medium comprising computer-executable instructions for calculating a skin deformation for a computer-animated character, the computer-executable instructions comprising instructions for:
  accessing, by one or more processors, a character rig representing the animated character and comprising a plurality of bones connected at one or more joints, a plurality of joint transforms, a plurality of control points, and a plurality of skin vertices;
  receiving, by the one or more processors, a selection of a control point of the plurality of control points;
  receiving, by the one or more processors, a selection of two or more joint transforms of the plurality of joint transforms;
  receiving, by the one or more processors, input representing user selection of a value for a skin deformation operation of the selected control point, wherein the skin deformation operation is controlled by the selected two or more joint transforms;
  receiving, by the one or more processors, a weight value for each of the two or more joint transforms, wherein the weight values represent relative amounts that each of the two or more joint transforms contribute to the skin deformation operation;
  determining, by the one or more processors, a deformed position of at least one skin vertex of the plurality of skin vertices by calculating the skin deformation operation of the selected control point based on the value for the skin deformation operation and the weight values for the two or more joint transforms; and
  displaying skin of at least a portion of the computer-animated character, wherein the displayed skin includes skin at the deformed position of the at least one skin vertex.

17. The non-transitory computer-readable storage medium of claim 16, wherein the skin deformation operation comprises a bulge operation or a slide operation.

18. The non-transitory computer-readable storage medium of claim 16, wherein calculating the skin deformation operation of the selected control point based on the value for the skin deformation and the weight values for the two or more joint transforms comprises:
  determining, by the one or more processors, a skin deformation contribution for each of the two or more joint transforms by multiplying the value for the skin deformation operation by each of the weight values; and
  calculating a sum of the determined skin deformation contributions.

19. A non-transitory computer-readable storage medium comprising computer-executable instructions for calculating a skin deformation for a computer-animated character, the computer-executable instructions comprising instructions for:
  accessing, by one or more processors, a character rig representing the animated character and comprising a plurality of bones connected at one or more joints, a plurality of joint transforms, a plurality of control points, and a plurality of skin vertices;
  determining, by the one or more processors, a bulge amount of a bulge skin deformation operation of a control point of the plurality of control points,
    wherein the bulge skin deformation operation is controlled by a joint transform of the plurality of joint transforms, and
    wherein the bulge amount represents a distance between a skin vertex and a twist axis between the joint transform and an adjacent joint transform of the plurality of joint transforms;
  determining, by the one or more processors, a vector that is orthogonal to the twist axis, wherein the vector passes through the skin vertex and the twist axis;
  determining, by the one or more processors, a position of the skin vertex based on the determined bulge amount and the determined vector; and
  displaying skin of at least a portion of the computer-animated character, wherein the displayed skin includes skin at the determined position of the skin vertex.

20. The non-transitory computer-readable storage medium of claim 19, wherein determining the bulge amount comprises determining an orientation of the joint transform, and wherein the bulge amount depends on the determined orientation of the joint transform.

21. The non-transitory computer-readable storage medium of claim 19, wherein the skin vertex is associated with the twist axis by an attachment vector that is not orthogonal to the twist axis.

22. The non-transitory computer-readable storage medium of claim 19, wherein the determined position of the skin vertex is a position along the vector that is a distance equal to the bulge amount away from the twist axis.

23. A system for configuring a skin deformation for a computer-animated character, the apparatus comprising:
a processor configured to:
access a character rig representing the animated character and comprising a plurality of bones connected at one or more joints, a plurality of joint transforms, a plurality of control points, and a plurality of skin vertices;
receive a selection of a joint transform of the plurality of joint transforms,
wherein a bulge skin deformation operation of at least one control point of the plurality of control points is controlled by the selected joint transform;
receive input representing user selection of an orientation of a reference vector assigned to the selected joint transform,
wherein a bulge direction of the bulge skin deformation operation of the at least one control point depends on the orientation of the reference vector;
determine a deformed position of at least one skin vertex of the plurality of skin vertices by calculating the bulge skin deformation operation of the at least one control point based on the orientation of the reference vector; and
display skin of at least a portion of the computer-animated character, wherein the displayed skin includes skin at the deformed position of the at least one skin vertex.

24. The system of claim 23, wherein the at least one control point is associated with an in bulge value, an out bulge value, and a side bulge value, and wherein calculating the bulge skin deformation operation of the at least one control point comprises calculating a bulge amount and the bulge direction based on the in bulge value, the out bulge value, the side bulge value, and the orientation of the reference vector.

25. The system of claim 23, wherein the orientation of the reference vector comprises a set of three-dimensional coordinates that are referenced with respect to an orientation of the selected joint transform.

26. The system of claim 23, wherein the character rig further comprises:
a first twist axis between the selected joint transform and a first adjacent joint transform; and
a second twist axis between the selected joint transform and a second adjacent joint transform, wherein the reference vector is non-overlapping with a bisection of the first twist axis and the second twist axis.

27. A system for calculating a skin deformation for a computer-animated character, the system comprising:
a processor configured to:
access a character rig representing the animated character and comprising a plurality of bones connected at one or more joints, a plurality of joint transforms, a plurality of control points, and a plurality of skin vertices;
receive a selection of a control point of the plurality of control points;
receive a selection of two or more joint transforms of the plurality of joint transforms;
receive input representing user selection of a value for a skin deformation operation of the selected control point, wherein the skin deformation operation is controlled by the selected two or more joint transforms;
receive a weight value for each of the two or more joint transforms, wherein the weight values represent relative amounts that each of the two or more joint transforms contribute to the skin deformation operation;
determine a deformed position of at least one skin vertex of the plurality of skin vertices by calculating the skin deformation operation of the selected control point based on the value for the skin deformation operation and the weight values for the two or more joint transforms; and
display skin of at least a portion of the computer-animated character, wherein the displayed skin includes skin at the deformed position of the at least one skin vertex.

28. The system of claim 27, wherein the skin deformation operation comprises a bulge operation or a slide operation.

29. The system of claim 27, wherein calculating the skin deformation operation of the selected control point based on the value for the skin deformation and the weight values for the two or more joint transforms comprises:
determining a skin deformation contribution for each of the two or more joint transforms by multiplying the value for the skin deformation operation by each of the weight values; and
calculating a sum of the determined skin deformation contributions.

30. A system for calculating a skin deformation for a computer-animated character, the system comprising:
a processor configured to:
access a character rig representing the animated character and comprising a plurality of bones connected at one or more joints, a plurality of joint transforms, a plurality of control points, and a plurality of skin vertices;
determine a bulge amount of a bulge skin deformation operation of a control point of the plurality of control points,
wherein the bulge skin deformation operation is controlled by a joint transform of the plurality of joint transforms, and
wherein the bulge amount represents a distance between a skin vertex and a twist axis between the joint transform and an adjacent joint transform of the plurality of joint transforms;
determine a vector that is orthogonal to the twist axis, wherein the vector passes through the skin vertex and the twist axis;
determine a position of the skin vertex based on the determined bulge amount and the determined vector; and
display skin of at least a portion of the computer-animated character, wherein the displayed skin includes skin at the determined position of the skin vertex.

31. The system of claim 30, wherein determining the bulge amount comprises determining an orientation of the joint transform, and wherein the bulge amount depends on the determined orientation of the joint transform.

32. The system of claim 30, wherein the skin vertex is associated with the twist axis by an attachment vector that is not orthogonal to the twist axis.

33. The system of claim 30, wherein the determined position of the skin vertex is a position along the vector that is a distance equal to the bulge amount away from the twist axis.

34. A computer-implemented method for calculating a skin deformation for a closed curve of a computer-animated character, the method comprising:
accessing, by one or more processors, the closed curve, wherein the closed curve comprises a plurality of transforms sequentially coupled together to form a loop;
generating, by the one or more processors, a duplicate transform of a first transform of the plurality of transforms, wherein the duplicate transform comprises a location corresponding to a location of the first transform and an orientation corresponding to an orientation of the first transform;

calculating, by the one or more processors, base frames and delta twists and orientations for each of the plurality of transforms and the duplicate transform; and calculating, by the one or more processors, the skin deformation using the calculated base frames and delta twists and orientations, wherein the skin deformation for skin vertices coupled to the closed curve between the first transform and an adjacent second transform are calculated using the calculated base frames and delta twists and orientations for the duplicate transform and the second transform; and displaying skin of at least a portion of the computer-animated character, wherein the displayed skin includes the calculated skin deformation.

* * * * *